(12) United States Patent
Yamamoto et al.

(10) Patent No.: US 11,996,749 B2
(45) Date of Patent: May 28, 2024

(54) ARMATURE

(71) Applicant: AISIN CORPORATION, Kariya (JP)

(72) Inventors: Yoshihisa Yamamoto, Anjo (JP); Kiyotaka Koga, Anjo (JP); Takahiro Kobuchi, Anjo (JP)

(73) Assignee: AISIN CORPORATION, Kariya (JP)

( * ) Notice: Subject to any disclaimer, the term of this patent is extended or adjusted under 35 U.S.C. 154(b) by 461 days.

(21) Appl. No.: 17/292,731

(22) PCT Filed: Jan. 30, 2020

(86) PCT No.: PCT/JP2020/003557
§ 371 (c)(1),
(2) Date: May 11, 2021

(87) PCT Pub. No.: WO2020/162333
PCT Pub. Date: Aug. 13, 2020

(65) Prior Publication Data
US 2021/0391763 A1 Dec. 16, 2021

(30) Foreign Application Priority Data
Feb. 6, 2019 (JP) .................................. 2019-019935

(51) Int. Cl.
*H02K 3/12* (2006.01)
*H02K 3/34* (2006.01)

(52) U.S. Cl.
CPC ............... *H02K 3/12* (2013.01); *H02K 3/345* (2013.01)

(58) Field of Classification Search
CPC ................................. H02K 3/12; H02K 3/345
See application file for complete search history.

(56) References Cited

U.S. PATENT DOCUMENTS

| 6,011,332 | A | 1/2000 | Umeda et al. | |
|---|---|---|---|---|
| 10,250,093 | B2 | 4/2019 | Hattori | |
| 11,362,561 | B2 * | 6/2022 | Kuroyanagi | H02K 3/525 |
| 11,451,120 | B2 * | 9/2022 | Koga | H02K 3/34 |
| 11,469,650 | B2 * | 10/2022 | Koga | H02K 15/0031 |
| 11,509,181 | B2 * | 11/2022 | Koga | H02K 15/10 |
| 11,557,935 | B2 * | 1/2023 | Sung | H02K 15/12 |
| 2004/0000423 | A1 * | 1/2004 | Emery | H02K 3/40 |
| | | | | 174/138 E |
| 2004/0007931 | A1 | 1/2004 | Gorohata et al. | |

(Continued)

FOREIGN PATENT DOCUMENTS

| EP | 0 881 752 A1 | 12/1998 |
|---|---|---|
| JP | H11-98788 A | 4/1999 |

(Continued)

OTHER PUBLICATIONS

Nov. 25, 2021 European Search Report issued in European Patent Application No. 20752994.2.

(Continued)

*Primary Examiner* — Robert W Horn
(74) *Attorney, Agent, or Firm* — Oliff PLC

(57) ABSTRACT

In the armature, a first connecting part and a second connecting part that are disposed so as to be adjacent to a connecting part of a different phase have a higher insulatable voltage value than a first leg part and a second leg part that are disposed so as to be adjacent to a leg part of the same phase.

10 Claims, 23 Drawing Sheets

(56) References Cited

U.S. PATENT DOCUMENTS

| | | | | |
|---|---|---|---|---|
| 2011/0278973 A1* | 11/2011 | Utaka | ................... | H02K 3/28 |
| | | | | 310/71 |
| 2016/0172919 A1 | 6/2016 | Hattori | | |
| 2017/0040859 A1* | 2/2017 | Langlard | ................ | H02K 3/28 |
| 2021/0351653 A1* | 11/2021 | Koga | ................. | H02K 15/064 |
| 2021/0391763 A1* | 12/2021 | Yamamoto | ............ | H02K 3/345 |

FOREIGN PATENT DOCUMENTS

| | | | | | |
|---|---|---|---|---|---|
| JP | 2004-32892 A | | 1/2004 | | |
| JP | 2004032892 A | * | 1/2004 | ............. | H02K 3/12 |
| JP | 2004-064989 A | | 2/2004 | | |
| JP | 2004064989 A | * | 2/2004 | | |
| JP | 2009-195009 A | | 8/2009 | | |
| JP | 2009195009 A | * | 8/2009 | | |
| JP | 2013-128363 A | | 6/2013 | | |
| JP | 2013128363 A | * | 6/2013 | | |
| JP | 2015-023771 A | | 2/2015 | | |

OTHER PUBLICATIONS

Apr. 7, 2020 International Search Report issued in International Patent Application No. PCT/JP2020/003557.

* cited by examiner

ARMATURE

TECHNICAL FIELD

The present disclosure relates to an armature.

BACKGROUND ART

Conventionally, there is known an armature including segment conductors provided with connecting parts. Such an armature is disclosed in, for example, JP 2004-64989 A.

The above-described JP 2004-64989 A discloses a stator including a stator core provided with a plurality of slots. Segment conductors having a U-shape are inserted into the slots of the stator core. Specifically, each segment conductor includes a pair of slot inserting parts that extend linearly; and an insertion-side end part that connects together one ends of the pair of slot inserting parts. The pair of slot inserting parts is inserted into different slots. In addition, the insertion-side end part is provided so as to protrude from one axial side of a slot. In addition, each segment conductor has a pair of joint-side end parts that are provided integrally with the slot inserting parts at the other ends of the slot inserting parts. Each of the pair of joint-side end parts is provided so as to protrude from the other axial side of a slot. The pair of joint-side end parts are bent so as to come close to each other, with the pair of joint-side end parts protruding from the other axial side of the slots, and then the end parts thereof are joined together.

Here, there is a case in which each of the plurality of joint-side end parts (insertion-side end parts) is disposed so as to be adjacent to a joint-side end part (insertion-side end part) of a different phase, and each of the plurality of slot inserting parts is disposed in a slot so as to be adjacent to a slot inserting part of the same phase. In this case, the joint-side end parts (insertion-side end parts) of different phases disposed so as to be adjacent to each other require high insulation performance over the slot inserting parts of the same phase disposed so as to be adjacent to each other. Hence, it is conceivable that as in the above-described JP 2004-64989 A, by performing an insulation process such as formation of a powder coating film on each of the insertion-side end parts and the joint-side end parts, the insulation performance of the insertion-side end parts (joint-side end parts) can be improved over the slot inserting parts.

CITATIONS LIST

Patent Literature

Patent Literature 1: JP 2004-64989 A

SUMMARY OF DISCLOSURE

Technical Problems

However, in a conventional armature such as that described in the above-described JP 2004-64989 A, since at least one side of a connecting part having been subjected to an insulation process passes through a slot, the connecting part (e.g., an insulating layer formed on the connecting part) may be damaged. In addition, upon joining together connecting parts by a joining process such as welding after inserting segment conductors into slots, the connecting parts (e.g., insulating layers formed on the connecting parts) may be damaged due to the joining process. Namely, the conventional armature such as that described in the above-described JP 2004-64989 A has a problem that when segment conductors are disposed in a stator core in an axial direction, connecting parts having been subjected to an insulation process are damaged (insulating layers formed on the connecting parts, etc., are damaged). Note that while it is possible to radially insert, using divided cores (stator cores divided circumferentially), segment conductors into the stator cores, losses (e.g., iron losses caused by an increase in magnetic reluctance) may get worse due to the division of the stator core.

The disclosure is made to solve problems such as those described above, and provides an armature capable of preventing damage to connecting parts having been subjected to an insulation process, while more securely insulating the connecting parts from each other when segment conductors are disposed in an armature core in an axial direction.

Solutions to Problems

To provide the above-described armature, an armature according to a first aspect of the disclosure includes: an armature core provided with a plurality of slots extending in an axial direction; and a coil part including: first segment conductors of a plurality of phases each including a pair of first leg parts extending toward one axial side in the axial direction, and a first connecting part that connects together end parts on an other axial side of the pair of first leg parts; second segment conductors of a plurality of phases each including a pair of second leg parts extending toward the other axial side in the axial direction, and a second connecting part that connects together end parts on the one axial side of the pair of second leg parts; and a joint part where an end part on the one axial side of one of the first leg parts and an end part on the other axial side of one of the second leg parts are joined together in one of the slots or axially outside one of the slots, and the first leg parts of each of the plurality of first segment conductors each are disposed so as to be adjacent to the first leg part of a same phase, the second leg parts of each of the plurality of second segment conductors each are disposed so as to be adjacent to the second leg part of a same phase, the first connecting part of each of the plurality of first segment conductors is disposed so as to be adjacent to the first connecting part of a different phase, the second connecting part of each of the plurality of second segment conductors is disposed so as to be adjacent to the second connecting part of a different phase, and the first connecting part and the second connecting part have a higher insulatable voltage value than the first leg parts and the second leg parts. Note that the joint part refers to a portion in a broad sense including not only a portion where joining together is performed through a joint material, but also a portion where there is only contact without through a joint material.

Here, connecting parts of different phases disposed so as to be adjacent to each other require high insulation performance over leg parts of the same phase disposed so as to be adjacent to each other. Thus, in the armature according to the first aspect of the disclosure, as described above, the first connecting part and the second connecting part have a higher insulatable voltage value than the first leg part and the second leg part, by which each of the first connecting part and the second connecting part can be more securely insulated.

In addition, as described above, the above-described armature includes the first segment conductors and the second segment conductors. A first leg part of a first segment conductor and a second leg part of a second segment conductor are joined together. Namely, before joining together the first leg part and the second leg part, the first segment conductor and the second segment conductor are provided separately (detached) from each other. In this case, by moving the first segment conductor to one axial side (a direction side on which the first leg part is provided with respect to the first connecting part) and moving the second segment conductor to the other axial side (a direction side on which the second leg part is provided with respect to the second connecting part), the first leg part and the second leg part are disposed so as to be close to each other and are joined together. By this, without inserting each of the first connecting part and the second connecting part into a slot in the axial direction, the first leg part and the second leg part can be brought close to each other and can be joined together. As a result, since there is no passing of a connecting part through a slot, damage to a connecting part having been subjected to an insulation process (e.g., formation of an insulating coating and disposition of an insulating member) to improve insulation performance (insulatable voltage value) (damage to the insulating coating and the insulating member) can be prevented.

In addition, in the above-described armature, unlike a case in which at least one of a first connecting part and a second connecting part is inserted into a slot in the axial direction, segment conductors can be disposed in slots, with first connecting parts (second connecting parts) joined together in advance. Namely, there is no need to join together the first connecting parts (the second connecting parts) by a joining process such as welding after disposing the segment conductors in the slots. By this, damage to the connecting parts (damage to insulating coatings and insulating members) caused by the joining process can be prevented.

As a result of the above, when segment conductors are disposed in the armature core in the axial direction, connecting parts can be more securely insulated from each other, and damage to the connecting parts having been subjected to an insulation process can be prevented.

An armature according to a second aspect of the disclosure includes: an armature core provided with a plurality of slots extending in an axial direction; and a coil part including: first segment conductors of a plurality of phases each including a pair of first leg parts extending toward one axial side in the axial direction, and a first connecting part that connects together end parts on an other axial side of the pair of first leg parts; second segment conductors of a plurality of phases each including a pair of second leg parts extending toward the other axial side in the axial direction, and a second connecting part that connects together end parts on the one axial side of the pair of second leg parts; and a joint part where an end part on the one axial side of one of the first leg parts and an end part on the other axial side of one of the second leg parts are joined together in one of the slots or axially outside one of the slots, and each of the pair of first leg parts is provided with a first-leg-part-side insulating layer, each of the pair of second leg parts is provided with a second-leg-part-side insulating layer, at least a portion of the first connecting part where the first connecting parts of different phases are disposed so as to be adjacent to each other is provided with a first-connecting-part-side insulating layer larger in thickness than the first-leg-part-side insulating layer, and at least a portion of the second connecting part where the second connecting parts of different phases are disposed so as to be adjacent to each other is provided with a second-connecting-part-side insulating layer larger in thickness than the second-leg-part-side insulating layer. Note that the joint part refers to a portion in a broad sense including not only a portion where joining together is performed through a joint material, but also a portion where there is only contact without through a joint material.

In the armature according to the second aspect of the disclosure, as described above, at least a portion of a first connecting part where first connecting parts of different phases are disposed so as to be adjacent to each other is provided with a first-connecting-part-side insulating layer larger in thickness than the first-leg-part-side insulating layer, and at least a portion of a second connecting part where second connecting parts of different phases are disposed so as to be adjacent to each other is provided with a second-connecting-part-side insulating layer larger in thickness than the second-leg-part-side insulating layer. By this, each of the first connecting part and the second connecting part can be more securely insulated.

In addition, as described above, the above-described armature includes the first segment conductors and the second segment conductors. A first leg part of a first segment conductor and a second leg part of a second segment conductor are joined together. Here, before joining together the first leg part and the second leg part, the first segment conductor and the second segment conductor are provided separately (detached) from each other. In this case, by moving the first segment conductor to one axial side (a direction side on which the first leg part is provided with respect to the first connecting part) and moving the second segment conductor to the other axial side (a direction side on which the second leg part is provided with respect to the second connecting part), the first leg part and the second leg part are disposed so as to be close to each other and are joined together. By this, without inserting each of the first connecting part and the second connecting part into a slot in the axial direction, the first leg part and the second leg part can be brought close to each other and can be joined together. As a result, since there is no passing of a connecting part through a slot, damage to the connecting part (damage to a first-connecting-part-side insulating layer and a second-connecting-part-side insulating layer) can be prevented.

In addition, in the above-described armature, unlike a case in which at least one of a first connecting part and a second connecting part is inserted into a slot in the axial direction, segment conductors can be disposed in slots, with first connecting parts (second connecting parts) joined together in advance. Namely, there is no need to join together the first connecting parts (the second connecting parts) by a joining process such as welding after disposing the segment conductors in the slots. By this, damage to the connecting parts (damage to a first-connecting-part-side insulating layer and a second-connecting-part-side insulating layer) caused by the joining process can be prevented.

As a result of the above, when segment conductors are disposed in the armature core in the axial direction, connecting parts can be more securely insulated from each other, and damage to the connecting parts (damage to a first-connecting-part-side insulating layer and a second-connecting-part-side insulating layer) can be prevented.

In addition, compared to a case in which at least one of a first connecting part and a second connecting part is inserted into a slot in the axial direction, an increase in the axial opening area of the slot can be prevented, and an increase in the size of the armature core can be prevented. By this, in a case in which a first segment conductor and a second segment conductor are disposed in the armature core in the axial direction, even when the thickness of a first-connecting-part-side insulating layer is larger than the thickness of a first-leg-part-side insulating layer and the thickness of a second-connecting-part-side insulating layer is larger than the thickness of a second-leg-part-side insulating layer, compared to a case in which at least one of a first connecting part and a second connecting part is inserted into a slot in the axial direction, an increase in the size of the armature core can be prevented.

In addition, since a first leg part and a second leg part can be brought close to each other without inserting each of a first connecting part and a second connecting part into a slot, there is no need to insert a coil part from the radial inner side. As a result, the insulating layers of the connecting parts can be prevented from getting damaged by pressing from the radial inner side upon insertion from the radial inner side. In addition, by axially moving each of the first segment conductors and the second segment conductors, there is no need to use a plurality of armature cores which are divided circumferentially and to dispose the leg parts in the slots by radially moving the divided armature cores. As a result, compared to a case in the armature core is divided, losses in the armature core (e.g., iron losses caused by an increase in magnetic reluctance) can be prevented from getting worse.

In addition, since a first leg part and a second leg part can be brought close to each other without inserting each of a first connecting part and a second connecting part into a slot, there is no need to increase the top-view area of the slot. As a result, the physical size of the armature core can be prevented from increasing and losses in the armature can be prevented from getting worse.

Advantageous Effects of Disclosure

According to the present disclosure, as described above, when segment conductors are disposed in an armature core in an axial direction, connecting parts can be more securely insulated from each other, and damage to the connecting parts having been subjected to an insulation process can be prevented.

DESCRIPTION OF EMBODIMENTS

The present embodiments of the present disclosure will be described below based on the drawings.

First Embodiment

[Structure of a Stator]

With reference to FIGS. 1 to 17, a structure of a stator 100 according to the present embodiment will be described. The stator 100 has an annular shape having a central axis line C at the center thereof. Note that the stator 100 is an example of an "armature" in the claims.

Figure 1:
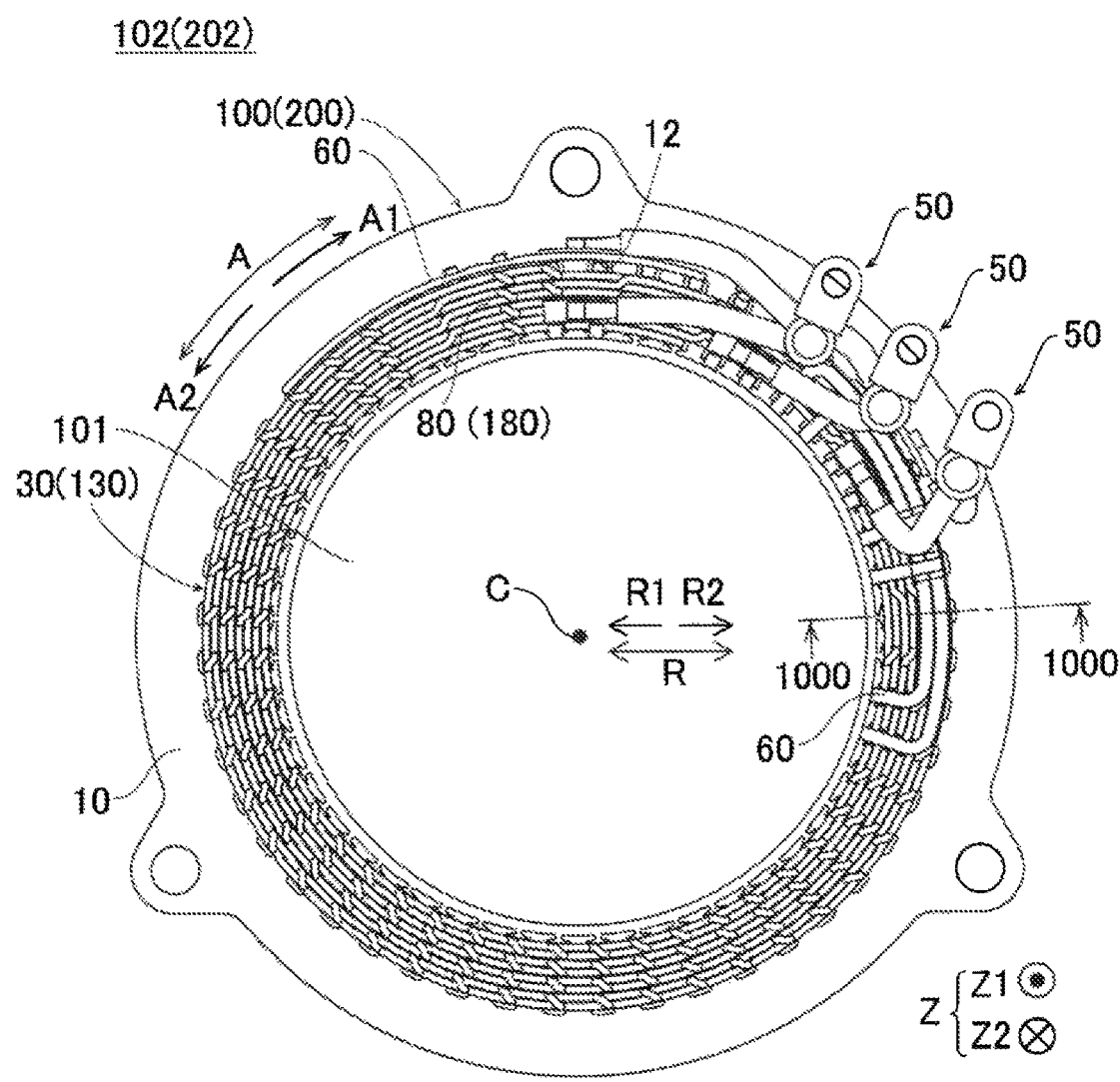
FIG. 1 is a plan view showing a configuration of a stator (rotating electrical machine) according to first and second embodiments.

In the specification of this application, an "axial direction (axis line direction)" refers to, as shown in FIG. 1, a direction (Z-direction) along the central axis line C of the stator 100 (a rotation axis line of a rotor 101). One axial side refers to a Z1-direction side, and the other axial side refers to a Z2-direction side. In addition, a "circumferential direction" refers to a circumferential direction (an A1-direction and an A2-direction) of the stator 100. In addition, a "radial direction" refers to a radial direction (R-direction) of the stator 100. In addition, a "radial inner side" refers to a direction (R1-direction) going toward the central axis line C of the stator 100 in the radial direction. In addition, a "radial outer side" refers to a direction (R2-direction) going toward the outside of the stator 100 in the radial direction.

The stator 100 together with the rotor 101 forms a part of a rotating electrical machine 102. The rotating electrical machine 102 is formed as, for example, a motor, a generator, or a motor-generator. As shown in FIG. 1, the stator 100 is disposed on the radial outer side of the rotor 101 provided with permanent magnets (not shown). Namely, in the present embodiment, the stator 100 forms a part of the inner-rotor rotating electrical machine 102.

Figure 2:
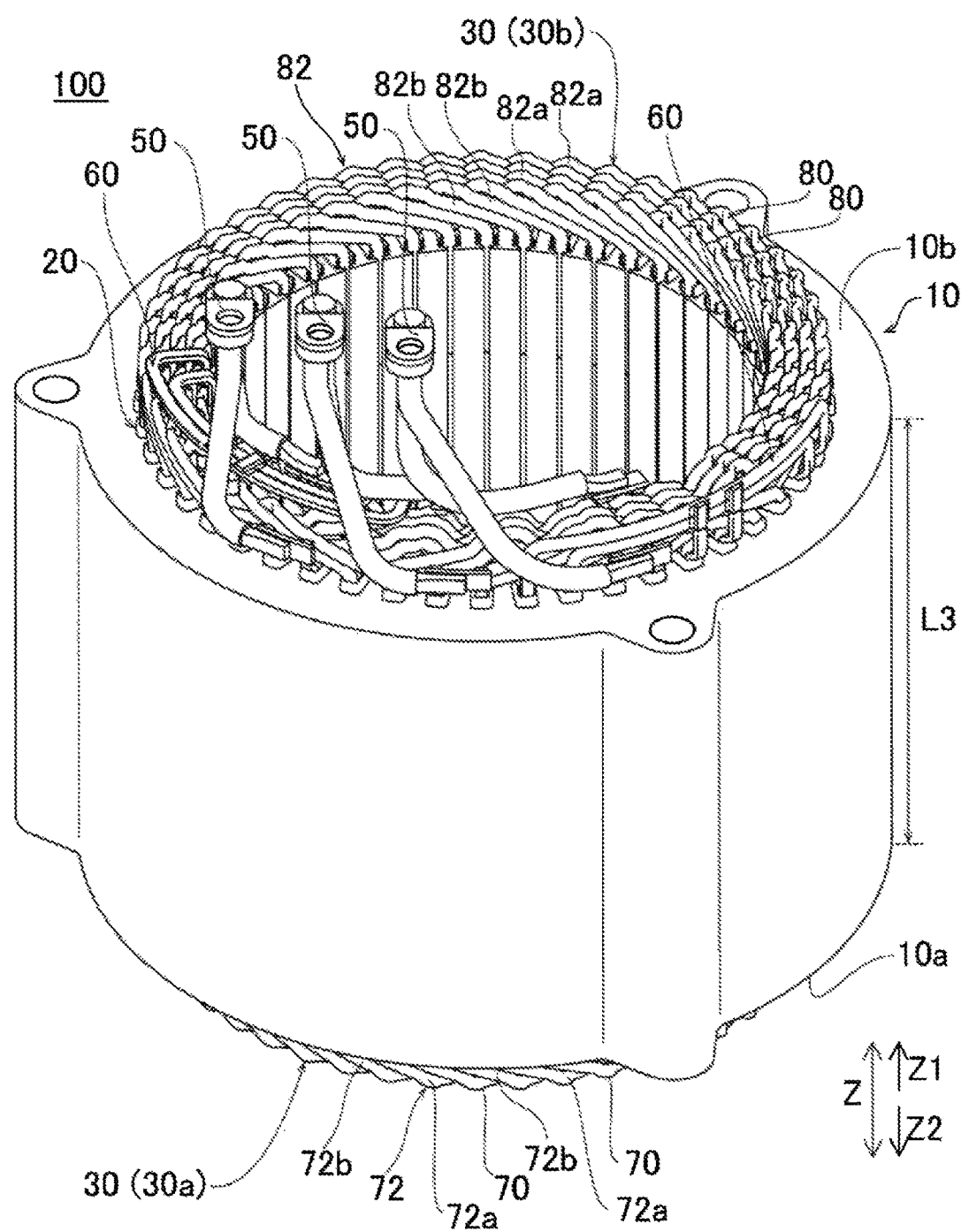
FIG. 2 is a perspective view showing a configuration of the stator according to the first embodiment.

As shown in FIG. 2, the stator 100 includes a stator core 10, sheet-type core leg part insulating members 20, and a coil part 30. Each core leg part insulating member 20 is disposed between a slot 12 (see FIG. 3) and the coil part 30 (first leg parts 71 and second leg parts 81 which will be described later) to insulate the slot 12 from the coil part 30. Namely, the core leg part insulating member 20 is inserted into the slot 12. The core leg part insulating member 20 is provided separately from an insulating layer 73 (see FIG. 8A) which will be described later and an insulating layer 83 (see FIG. 8B) which will be described later. Note that the stator core 10 is an example of an "armature core" in the claims.

In addition, the coil part 30 includes a first coil assembly 30a (counter-lead side coils) and a second coil assembly 30b (lead side coils). In addition, the coil part 30 includes a plurality of segment conductors 40 (see FIG. 4). In addition, the stator 100 includes sheet-type joint part insulating members 21 (see FIG. 4) provided separately from the core leg part insulating members 20.

(Structure of the Stator Core)

Figure 3:
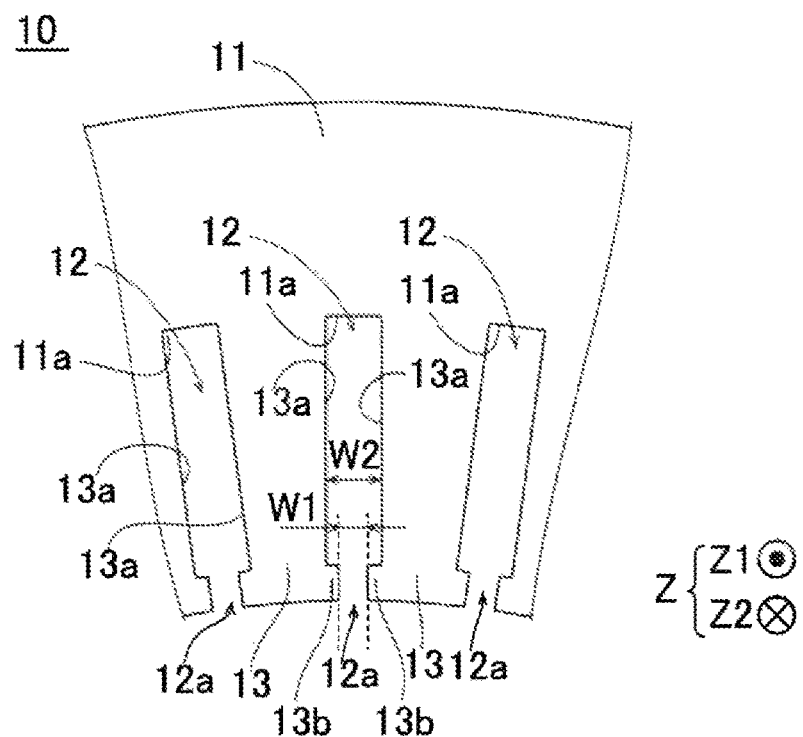
FIG. 3 is an enlarged partial plan view showing a configuration of a stator core according to the first and second embodiments.

The stator core 10 has a cylindrical shape having the central axis line C (see FIG. 1) as its central axis. In addition, the stator core 10 is formed by, for example, axially stacking a plurality of electromagnetic steel sheets (e.g., silicon steel sheets). As shown in FIG. 3, the stator core 10 is provided with a back yoke 11 having an annular shape as viewed in the axial direction; and a plurality of slots 12 provided on the radial inner side of the back yoke 11 and extending axially. The stator core 10 is provided with a plurality of teeth 13 on both circumferential sides of each slot 12.

The slots 12 each are a portion surrounded by a wall part 11a of the back yoke 11 provided on the radial outer side and circumferential side surfaces 13a of two teeth 13. The slot 12 is provided with an opening part 12a that opens on the radial inner side. In addition, the slot 12 opens on both axial sides. The teeth 13 are formed so as to protrude toward the radial inner side from the back yoke 11. Each tooth 13 has projecting parts 13b formed at its tip part on the radial inner side, the projecting parts 13b making opening parts 12a of slots 12.

The opening parts 12a each have an opening width W1 in the circumferential direction. Here, the opening width W1 corresponds to a distance between tip parts of projecting parts 13b of teeth 13. In addition, a width W2 of a portion of a slot 12 where the coil part 30 is disposed is larger than the opening width W1. Namely, the slot 12 is formed as a semi-open slot. Here, the width W2 corresponds to a distance between circumferential side surfaces 13a of teeth 13 disposed on both circumferential sides of the slot 12. In addition, the width W2 of the slot 12 is substantially constant in the radial direction.

(Structure of the Coil Part)

Figure 4:
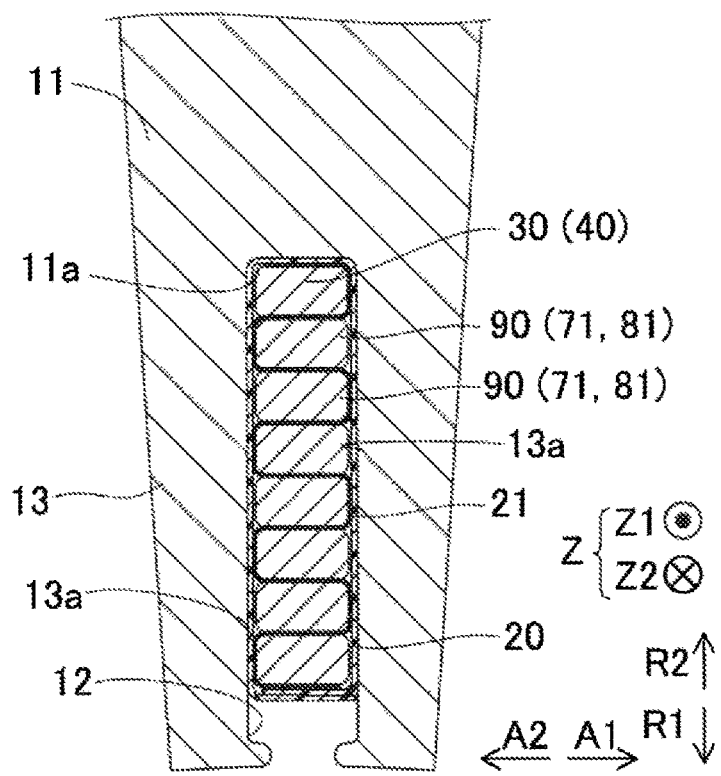
FIG. 4 is an enlarged partial cross-sectional view showing configurations of a core leg part insulating member and a joint part insulating member according to the first embodiment.

As shown in FIG. 4, the coil part 30 includes rectangular conducting wires. For example, the coil part 30 is made of copper or aluminum.

In addition, as shown in FIG. 2, the coil part 30 is formed by axially combining and joining together the first coil assembly 30a provided on the other axial side (Z2-direction side) and the second coil assembly 30b provided on one axial side (Z1-direction side). The first coil assembly 30a and the second coil assembly 30b each are formed in annular shape having the same central axis line C (see FIG. 1) as the stator core 10 at the center thereof. In addition, as shown in FIG. 4, in the present embodiment, the coil part 30 is formed by joining together first leg parts 71 and second leg parts 81 (described later) of a plurality of segment conductors 40 at joint parts 90.

The coil part 30 is formed as, for example, wave-winding coils. In addition, the coil part 30 is formed as 8-turn coils. Namely, the coil part 30 is formed such that eight segment conductors 40 are radially and parallelly disposed in a slot 12.

<Configuration of Connection of the Coil Part>

Figure 5:
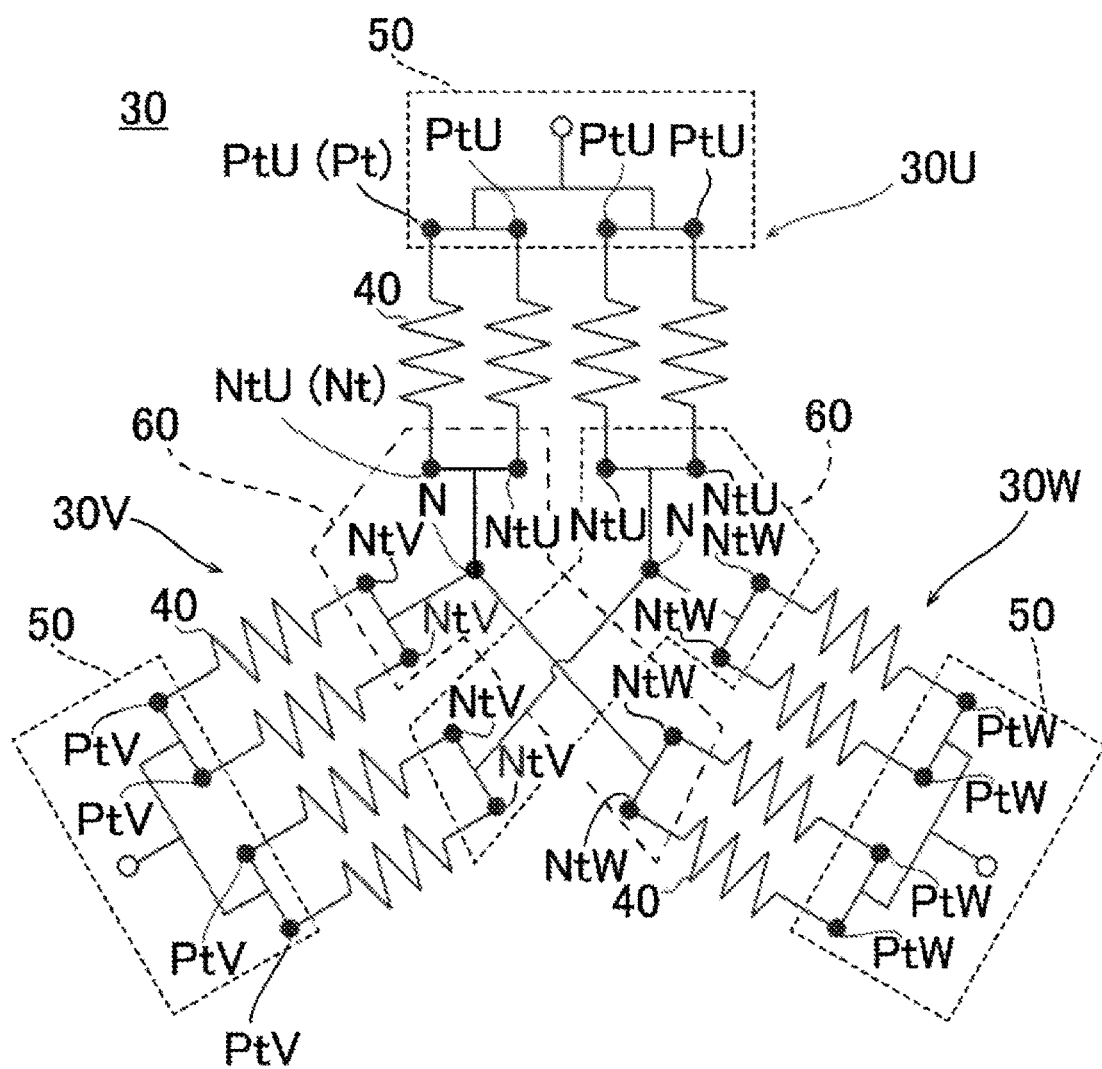
FIG. 5 is a circuit diagram showing a connection configuration of a coil part according to the first embodiment.

As shown in FIG. 5, the coil part 30 is configured to generate a magnetic flux by supplying three-phase alternating-current power thereto from a power supply part (not shown). Specifically, the coil part 30 is connected using three-phase Y connection. Namely, the coil part 30 includes a U-phase coil part 30U, a V-phase coil part 30V, and a W-phase coil part 30W. The coil part 30 is provided with a plurality of (e.g., two) neutral points N. Specifically, the coil part 30 is four parallel-connected (star-connected). Namely, the U-phase coil part 30U is provided with four neutral-point connection end parts NtU and four power-line connection end parts PtU. The V-phase coil part 30V is provided with four neutral-point connection end parts NtV and four power-line connection end parts PtV. The W-phase coil part 30W is provided with four neutral-point connection end parts NtW and four power-line connection end parts PtW. Note that in the following description, when the neutral-point connection end parts and the power-line connection end parts for the U-phase, the V-phase, and the W-phase are not particularly distinguished from each other, they are simply described as "neutral-point connection end parts Nt" and "power-line connection end parts Pt".

<Structure of the Coil Assemblies>

As shown in FIG. 2, the first coil assembly 30a includes a plurality of first segment conductors 70 (hereinafter, referred to as "first conductors 70") which are segment conductors 40. Preferably, the first coil assembly 30a is formed by a combination of only a plurality of first conductors 70.

In addition, the second coil assembly 30b includes a plurality of (e.g., three) power segment conductors 50 (hereinafter, referred to as "power conductors 50") which are segment conductors 40; a plurality of (e.g., two) neutral point segment conductors 60 (hereinafter, referred to as "neutral point conductors 60") which are segment conductors 40; and second segment conductors 80 (hereinafter, referred to as "second conductors 80") which are conductors (general segment conductors 40) different from the power conductors 50 and the neutral point conductors 60 among a plurality of segment conductors 40 and which form the coil part 30. Namely, all of the power conductors 50 and the neutral point conductors 60 provided in the stator 100 are provided in the second coil assembly 30b.

<Structures of the First Conductors and the Second Conductors>

Figure 6:
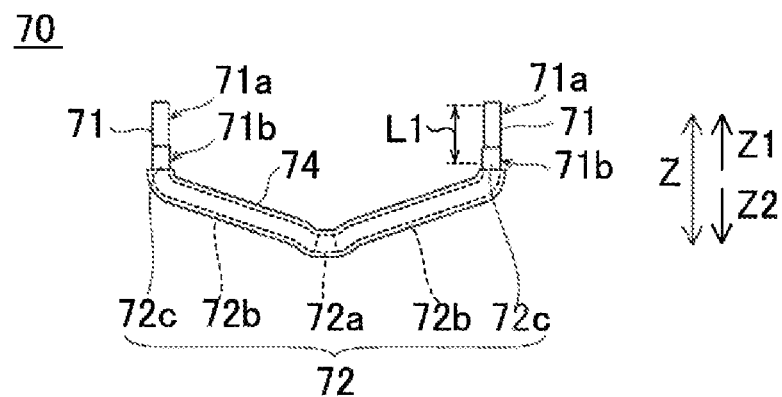
FIG. 6 is a front view showing a configuration of a first conductor according to the first embodiment.

As shown in FIG. 6, the coil part 30 includes a plurality of first conductors 70 each including a pair of first leg parts 71 extending toward one axial side (Z1-direction side) of the stator core 10. The plurality of first conductors 70 include first conductors 70 of a plurality of phases. Specifically, the plurality of first conductors 70 include first conductors for the U-phase 70, first conductors for the V-phase 70, and first conductors for the W-phase 70. In addition, each of the plurality of first conductors 70 is disposed on the other axial side (Z2-direction side) of the stator core 10. In addition, the first leg parts 71 of each of the plurality of first conductors 70 have a length L1 in the axial direction.

Figure 7:
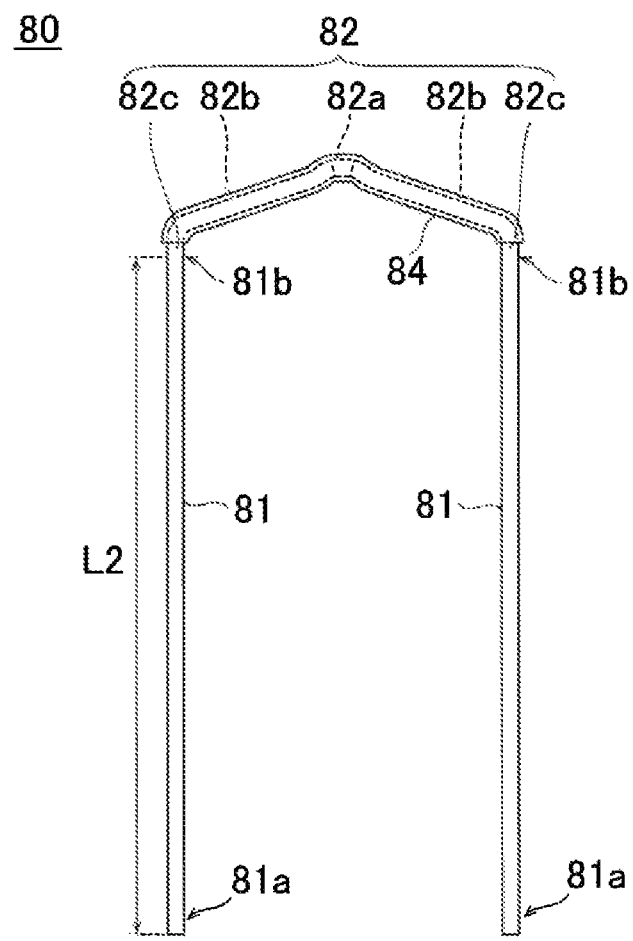
FIG. 7 is a front view showing a configuration of a second conductor according to the first embodiment.

In addition, as shown in FIG. 7, the coil part 30 includes a plurality of second conductors 80 each including a pair of second leg parts 81 extending toward the other axial side (Z2-direction side) of the stator core 10. The plurality of second conductors 80 include second conductors 80 of a plurality of phases. Specifically, the plurality of second conductors 80 include second conductors for the U-phase 80, second conductors for the V-phase 80, and second conductors for the W-phase 80. In addition, each of the plurality of second conductors 80 is disposed on one axial side (Z1-direction side) of the stator core 10. In addition, the plurality of second conductors 80 each are disposed so as to axially face the plurality of first conductors 70. In addition, the second leg parts 81 of each of the plurality of second conductors 80 have a length L2 in the axial direction. Note that the length L2 of the second leg parts 81 is longer than the length L1 of the first leg parts 71.

In addition, the coil part 30 is formed by joining together the first conductors 70 and the second conductors 80 which are two axially divided parts. Specifically, the coil part 30 includes joint parts 90 (see FIG. 10) where an end part 71a on one axial side of a first leg part 71 and an end part 81a on the other axial side of a second leg part 81 are joined together in one slot 12. Here, the second conductors 80 are segment conductors 40 other than the power conductors 50 and the neutral point conductors 60 among segment conductors 40 included in the second coil assembly 30b. Note that the end part 71a is a portion including a first plane disposition part 71d which will be described later. In addition, the end part 81a is a portion including a second plane disposition part 81d which will be described later.

As shown in FIG. 6, each of the first conductors 70 of a plurality of phases includes a first connecting part 72 that connects together end parts 71b on the other axial side (Z2-direction side) of a pair of first leg parts 71. Each of the first conductors 70 of a plurality of phases is formed so as to have a U-shape (substantially U-shape) as viewed in the radial direction by connecting together a pair of first leg parts 71 disposed in different slots 12 by a first connecting part 72. The coil pitch of the first conductors 70 is six. Namely, a pair of first leg parts 71 are disposed at circumferentially different locations corresponding to six slots 12. Namely, five slots 12 are provided between a slot 12 in which a first leg part 71 which is one of a pair of first leg parts 71 is disposed and a slot 12 in which the other first leg part 71 is disposed. Note that the first leg part 71 refers to a portion of the first conductor 70 that extends linearly and axially. Specifically, the first leg part 71 refers to a portion from the end part 71b to a tip part 71e of the first leg part 71 which will be described later. In addition, the first connecting part 72 refers to a portion of the first conductor 70 other than the first leg parts 71.

In addition, the first connecting part 72 has a bent shape that bends axially. Specifically, the first connecting part 72 has a first bent part 72a that bends at the center of the first connecting part 72. In addition, the first connecting part 72 has a pair of first diagonal parts 72b that linearly extend toward pair of first leg parts 71 sides from the first bent part 72a so as to intersect with each other. In addition, the first bent part 72a is formed in crank shape that radially bends in a stepwise manner by an amount corresponding to the width of one segment conductor 40 as viewed in the axial direction. That is, the radial width of the first bent part 72a is double the width of one segment conductor 40. Note that the expression "intersect with each other" refers to that extension lines of the first diagonal parts 72b intersect with each other on an axial outer side of the stator core 10 as viewed in the radial direction.

In addition, the axial lengths L1 of the pair of first leg parts 71 are substantially equal to each other. In addition, the axial length L1 is smaller than an axial length L3 (see FIG. 2) of the stator core 10. Note that the axial length L3 of the stator core 10 refers to an axial distance (space) between an end surface 10a and an end surface 10b in the axial direction.

Likewise, as shown in FIG. 7, each of the second conductors 80 of a plurality of phases includes a second connecting part 82 that connects together end parts 81b on one axial side (Z1-direction side) of a pair of second leg parts 81. Each of the second conductors 80 of a plurality of phases is formed so as to have a U-shape by connecting together a pair of second leg parts 81 disposed in different slots 12 by a second connecting part 82. The coil pitch of the second conductors 80 is six. Namely, a pair of second leg parts 81 are disposed at circumferentially different locations corresponding to six slots 12. Namely, five slots 12 are provided between a slot 12 in which a second leg part 81 which is one of a pair of second leg parts 81 is disposed and a slot 12 in which the other second leg part 81 is disposed. Note that the second leg part 81 refers to a portion of the second conductor 80 that extends linearly and axially. Specifically, the second leg part 81 refers to a portion from the end part 81b to a tip part 81e of the second leg part 81 which will be described later. In addition, the second connecting part 82 refers to a portion of the second conductor 80 other than the second leg parts 81.

In addition, the second connecting part 82 has a bent shape that bends axially. Specifically, the second connecting part 82 has a second bent part 82a that bends at the center of the second connecting part 82. In addition, the second connecting part 82 has a pair of second diagonal parts 82b that linearly extend toward pair of second leg parts 81 sides from the second bent part 82a so as to intersect with each other. In addition, the second bent part 82a is formed in crank shape that radially bends in a stepwise manner by an amount corresponding to the width of one segment conductor 40 as viewed in the axial direction. That is, the radial width of the second bent part 82a is double the width of one segment conductor 40.

In addition, the axial lengths L2 of the pair of second leg parts 81 of the second conductor 80 are substantially equal to each other. In addition, the axial length L2 of the pair of second leg parts 81 of the second conductor 80 is larger than the axial length L1 of the pair of first leg parts 71 of the first conductor 70 (L2>L1).

Figure 8A:
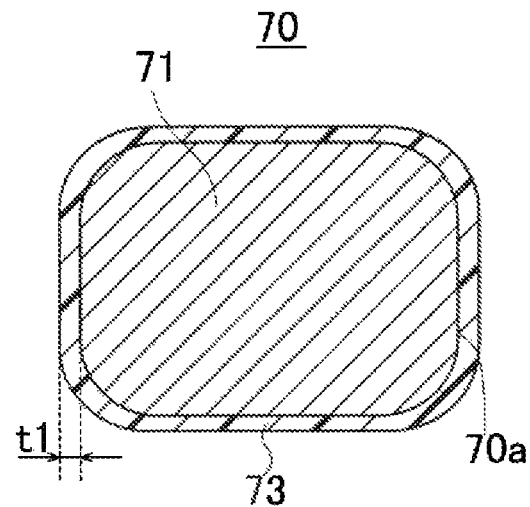
FIG. 8 is transverse cross-sectional views showing configurations of leg parts according to the first embodiment (FIG. 8A is a transverse cross-sectional view of a first leg part and FIG. 8B is a transverse cross-sectional view of a second leg part).

In addition, as shown in FIG. 8A, each of a pair of first leg parts 71 is provided with an insulating layer 73. Specifically, each segment conductor 40 (a first conductor 70 and a second conductor 80) is formed as a rectangular conducting wire whose transverse section has a substantially rectangular shape. A conductor surface 70a of the first conductor 70 is provided with an insulating layer 73 having a thickness t1. The thickness t1 of the insulating layer 73 is set to such a thickness that, for example, allows to ensure phase-to-phase insulation performance (insulation between first leg parts 71). Note that although FIG. 8A shows a magnitude relationship between thicknesses, etc., in an exaggerated manner for the sake of description, the configuration is not limited to the example shown in the drawing. In addition, the insulating layer 73 is an example of a "first-leg-part-side insulating layer" in the claims.

Figure 8B:
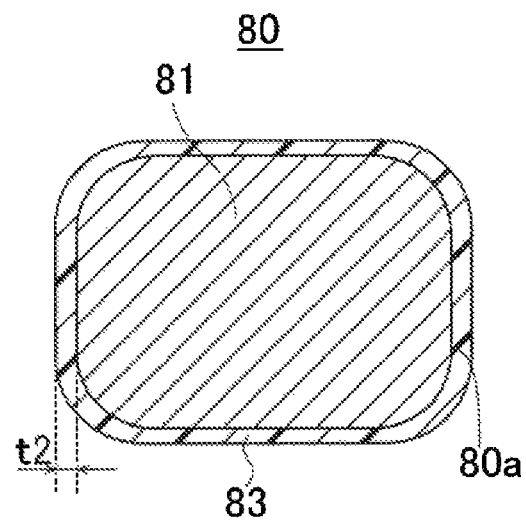

In addition, as shown in FIG. 8B, each of a pair of second leg parts 81 is provided with an insulating layer 83. Specifically, the insulating layer 83 of the second conductor 80 is provided with an insulating layer 83 having a thickness t2. The thickness t2 of the insulating layer 83 is set to such a thickness that, for example, allows to ensure intra-phase insulation performance (insulation between second leg parts 81). Note that although FIG. 8B shows a magnitude relationship between thicknesses, etc., in an exaggerated manner for the sake of description, the configuration is not limited to the example shown in the drawing. In addition, the thickness t2 of the insulating layer 83 is substantially equal to the thickness t1 of the insulating layer 73. Note that the insulating layer 83 is an example of a "second-leg-part-side insulating layer" in the claims.

Figure 10:
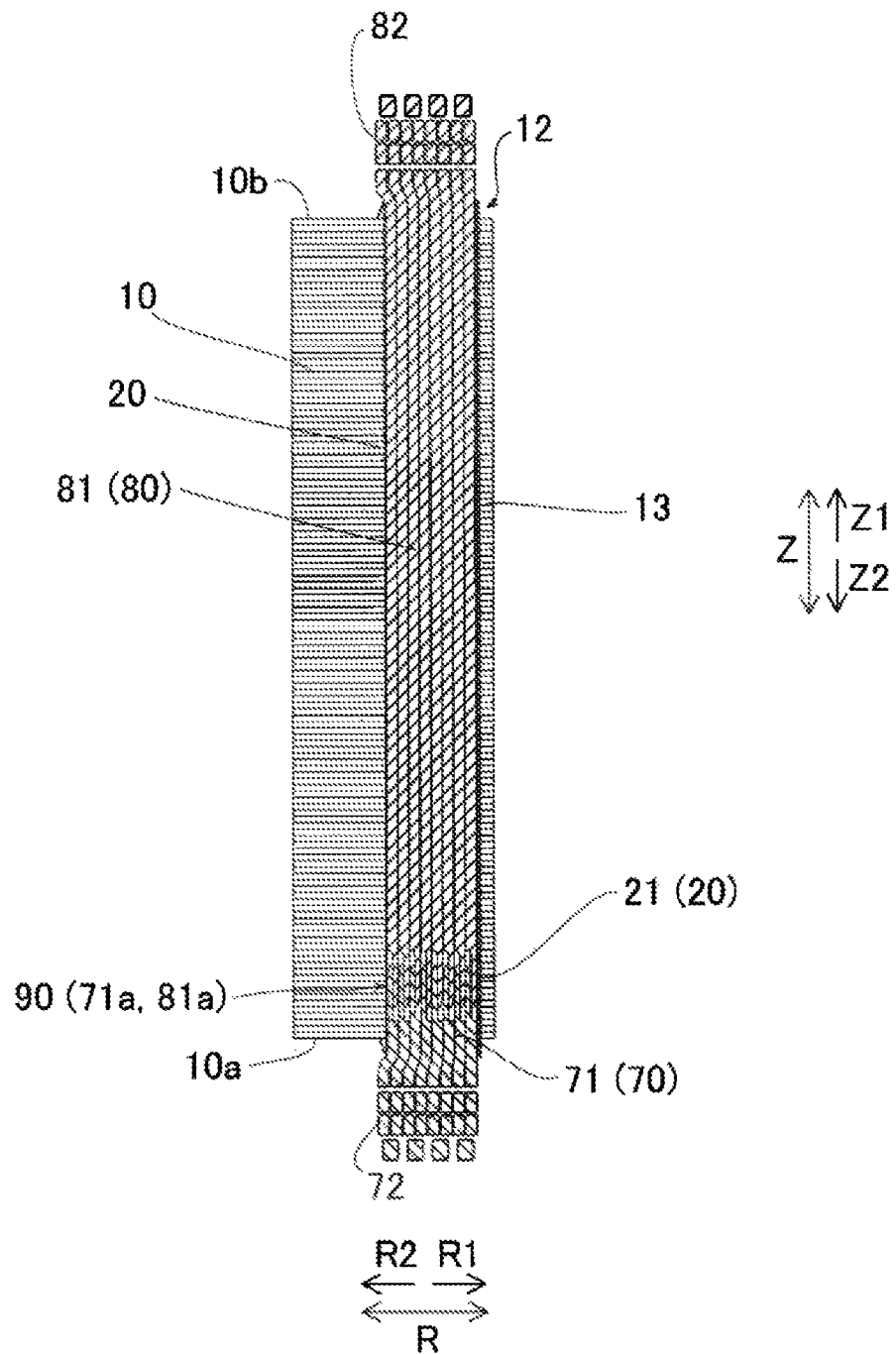
FIG. 10 is a cross-sectional view taken along line 1000-1000 of FIG. 1.

In addition, a plurality of first leg parts 71 are arranged in one slot 12 in the radial direction of the stator core 10 (see FIG. 10). In addition, a plurality of second leg parts 81 are arranged in one slot 12 in the radial direction of the stator core 10 (see FIG. 10).

Specifically, a plurality of first connecting parts 72 are arranged radially on the other axial side (Z2-direction side) in a slot 12 (see FIG. 10). In addition, a plurality of second connecting parts 82 are arranged radially on one axial side (Z1-direction side) in the slot 12 (see FIG. 10).

Here, as shown in FIG. 18, a first connecting part 72 of each of a plurality of first conductors 70 is disposed so as to be adjacent to first connecting parts 72 of different phases. In FIG. 18, U-phase, V-phase, and W-phase segment conductors are described as U, V, and W, respectively. Specifically, the entire pair of first diagonal parts 72b of a first connecting part 72 is provided so as to be (radially and axially) adjacent to first diagonal parts 72b of first connecting parts 72 of different phases (see FIG. 11). Note that although FIG. 18 only shows the first connecting parts 72, the second connecting parts 82 also have the same configuration and thus depiction thereof is omitted.

In addition, as shown in FIG. 7, a second connecting part 82 of each of a plurality of second conductors 80 is disposed so as to be adjacent to second connecting parts 82 of different phases. Specifically, the entire pair of second diagonal parts 82b of a second connecting part 82 is provided so as to be (radially and axially) adjacent to second diagonal parts 82b of second connecting parts 82 of different phases (see FIG. 12).

Figure 18A:
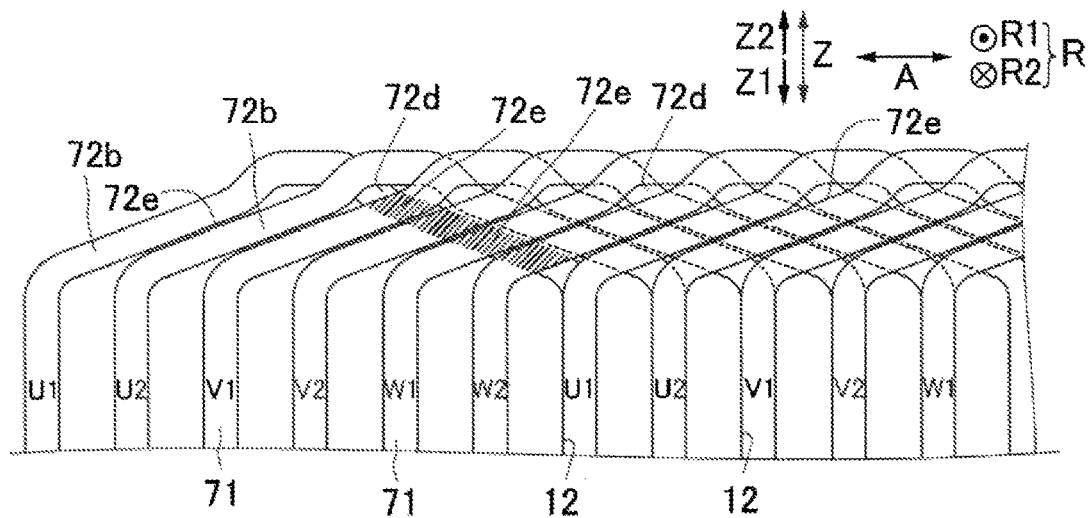
FIG. 18 is a diagram for describing configurations of the connecting parts according to the first embodiment (FIG. 18A is a diagram of first segment conductors disposed in slots as viewed from a radial inner side, FIG. 18B is a diagram of second segment conductors disposed in slots as viewed from the radial inner side, and FIG. 18C is an enlarged partial plan view of a portion near connecting parts).
Figure 18B:
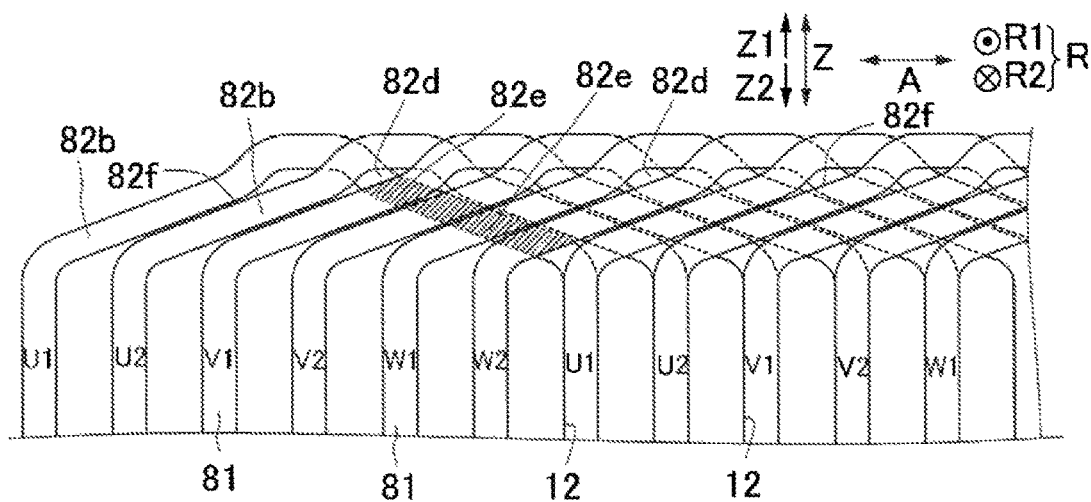

As shown in FIG. 18A, at least one of a pair of first diagonal parts 72b has portions 72e (hatched portions of FIG. 18A) each of which is partially provided on a plane 72d facing radially and is adjacent to a first connecting part 72 of a different phase. FIG. 18A shows a state in which four portions 72e are provided on each of a pair of linear parts 72b. In addition, as shown in FIG. 18B, as with the first connecting parts 72, each of a pair of second diagonal parts 82b is provided with portions 82e each of which is partially provided on a plane 82d facing radially and is adjacent to a second connecting part 82 of a different phase.

Figure 18C:
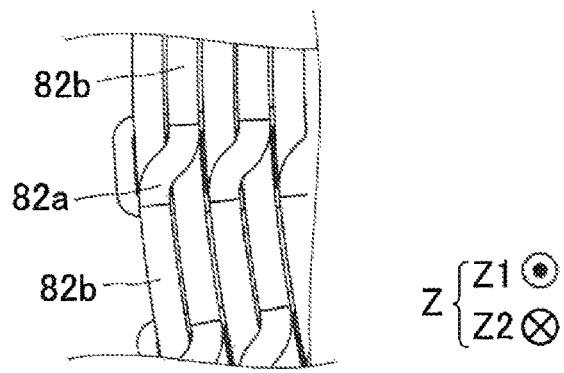

This results from the fact that, as shown in FIG. 18C, second diagonal parts 82b (first diagonal parts 72b) are disposed so as to be radially shifted relative to each other (one lane changed), with a second bent part 82a (first bent part 72a) being a change point. By this, second diagonal parts 82b (first diagonal parts 72b) of different phases are disposed so as to be radially and partially adjacent to each other.

Figure 11:
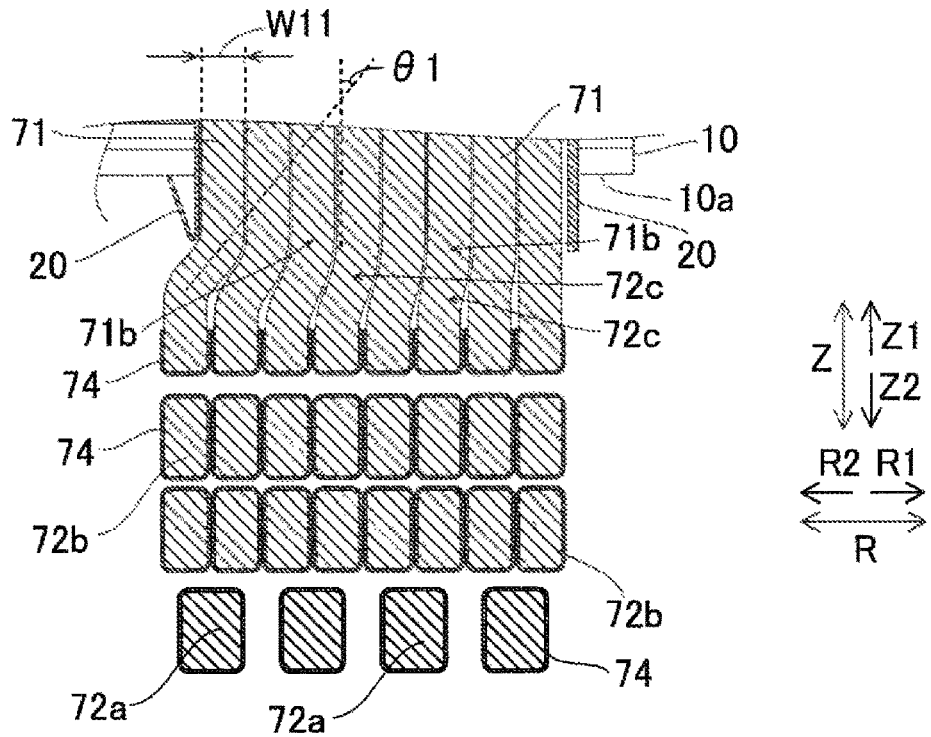
FIG. 11 is a partial enlarged view of a portion near first connecting parts of FIG. 10.

Specifically, a pair of first leg parts 71 is disposed so as to be shifted relative to each other in radial location by an amount corresponding to a radial width W11 of the first leg part 71 (see FIG. 11). In addition, a pair of second leg parts 81 is disposed so as to be shifted relative to each other in radial location by an amount corresponding to a radial width W12 of the second leg part 81 (see FIG. 12). In addition, a pair of first diagonal parts 72b is disposed so as to be shifted relative to each other in radial location by an amount corresponding to the radial width W11 of the first leg part 71. A pair of second diagonal parts 82b is disposed so as to be shifted relative to each other in radial location by an amount corresponding to the radial width W12 of the second leg part 81.

In addition, of a plurality of first diagonal parts 72b arranged radially, first diagonal parts 72b other than first diagonal parts 72b provided on the innermost and outermost circumferential sides are adjacent, on their radially facing planes 72d on both sides, to first connecting parts 72 of different phases. In addition, of a plurality of second diagonal parts 82b arranged radially, second diagonal parts 82b other than second diagonal parts 82b provided on the innermost and outermost circumferential sides are adjacent, on their radially facing planes 82d on both sides, to second connecting parts 82 of different phases.

In addition, a first diagonal part 72b also has, on a plane 72f facing circumferentially (axially), a portion where the first diagonal part 72b is circumferentially (axially) adjacent to a first diagonal part 72b of a different phase. Specifically, as shown in FIG. 18A, since U1, U2, V1, V2 . . . are arranged in this order from left to right, U2 is circumferentially (axially) adjacent to a first diagonal part 72b of V1. In addition, as shown in FIG. 18B, a second diagonal part 82b is also likewise provided with a plane 82f having a portion where the second diagonal part 82b is circumferentially (axially) adjacent to a second diagonal part 82b of a different phase.

Here, in the present embodiment, as shown in FIG. 6, the insulation performance of the first connecting parts 72 and the second connecting parts 82 is higher than the insulation performance of the first leg parts 71 and the second leg parts 81. Specifically, at least a portion of the first connecting part 72 where first connecting parts 72 of different phases are disposed so as to be adjacent to each other (i.e., the first diagonal parts 72b) is provided with an insulating layer 74 larger in thickness than the insulating layer 73 (see FIG. 8A). Note that the insulating layer 74 is an example of a "first-connecting-part-side insulating layer" in the claims. In addition, the expression "the insulation performance is high" refers to that an insulatable voltage value is high.

Figure 9A:
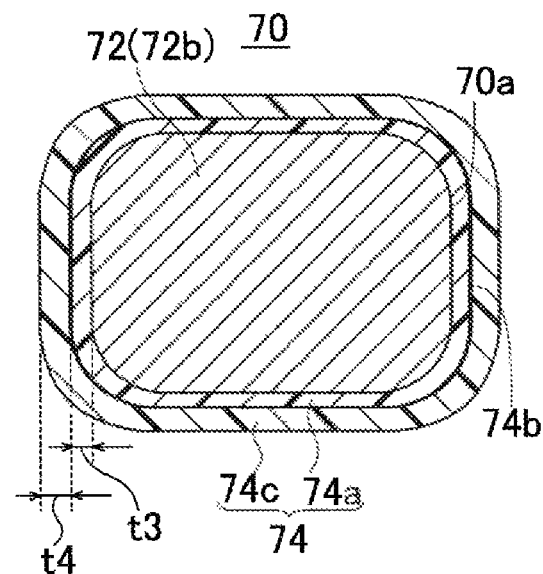
FIG. 9 is transverse cross-sectional views showing configurations of connecting parts according to the first embodiment (FIG. 9A is a transverse cross-sectional view of a first connecting part and FIG. 9B is a transverse cross-sectional view of a second connecting part).

Specifically, as shown in FIG. 9A, the insulating layer 74 includes a first base insulating layer 74a and a first added insulating layer 74c. The first base insulating layer 74a is integrally formed with the insulating layer 73 (see FIG. 8A) and has a thickness t3 equal to the thickness t1 of the insulating layer 73. The first added insulating layer 74c is provided on a surface 74b of the first base insulating layer 74a. A thickness t4 of the first added insulating layer 74c is larger than the thickness t1 of the insulating layer 73 (the thickness t3 of the first base insulating layer 74a). For example, the thickness t4 of the first added insulating layer 74c is about 1.5 times the thickness t1 of the insulating layer 73 (the thickness t3 of the first base insulating layer 74a). In this case, the thickness (t3+t4) of the insulating layer 74 is about 2.5 times the thickness t1 of the insulating layer 73. Note that the first added insulating layer 74c and the first base insulating layer 74a each are made of the same material (e.g., an insulating material such as polyimide) as the insulating layer 73.

In addition, as shown in FIG. 7, at least a portion of the second connecting part 82 where second connecting parts 82 of different phases are disposed so as to be adjacent to each other (i.e., the second diagonal parts 82b) is provided with an insulating layer 84 larger in thickness than the insulating layer 83 (see FIG. 8B). Note that the insulating layer 84 is an example of a "second-connecting-part-side insulating layer" in the claims.

Figure 9B:
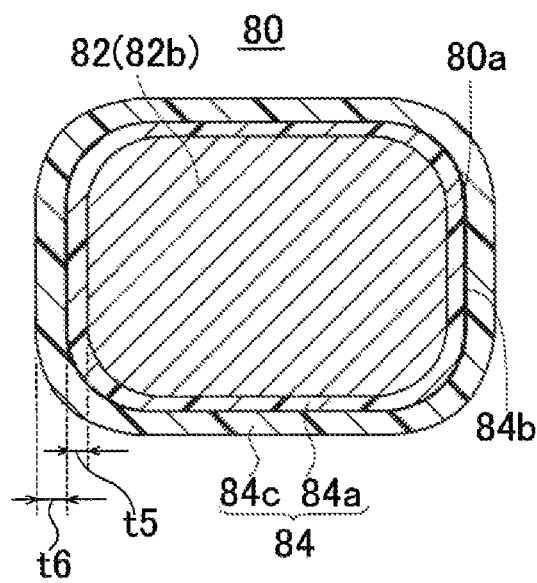

Specifically, as shown in FIG. 9B, the insulating layer 84 includes a second base insulating layer 84a and a second added insulating layer 84c. The second base insulating layer 84a is integrally formed with the insulating layer 83 (see FIG. 8B) and has a thickness t5 equal to the thickness t2 of the insulating layer 83. The second added insulating layer 84c is provided on a surface 84b of the second base insulating layer 84a. A thickness t6 of the second added insulating layer 84c is larger than the thickness t2 of the insulating layer 83 (the thickness t5 of the second base insulating layer 84a). For example, the thickness t6 of the second added insulating layer 84c is about 1.5 times the thickness t2 of the insulating layer 83 (the thickness t5 of the second base insulating layer 84a). In this case, the thickness (t5+t6) of the insulating layer 84 is about 2.5 times the thickness t2 of the insulating layer 83. Note that the second added insulating layer 84c and the second base insulating layer 84a each are made of the same material (e.g., an insulating material such as polyimide) as the insulating layer 83.

As described above, by providing the first added insulating layer 74c (second added insulating layer 84c) on the first connecting part 72 (second connecting part 82) having a relatively large voltage difference between different phases, the stator 100 can support high voltage.

In addition, in the present embodiment, as shown in FIG. 6, the insulating layer 74 (first added insulating layer 74c) is provided on each of the first bent part 72a and the pair of first diagonal parts 72b. Specifically, the insulating layer 74 (first added insulating layer 74c) is provided on a portion of the first connecting part 72 other than first inclined parts 72c which will be described later.

In addition, the first added insulating layer 74c of the insulating layer 74 provided on the first bent part 72a and the first added insulating layer 74c of the insulating layer 74 provided on each of the pair of first diagonal parts 72b are provided integrally. Specifically, the first added insulating layer 74c is a single insulating layer. In other words, the insulating layer 74 is an insulating layer that is not divided into a plurality of layers and is continuously formed on the first connecting part 72.

In addition, as shown in FIG. 9A, the insulating layer 74 is provided so as to surround the first connecting part 72 in a circumferential manner at a cross-section (transverse section) orthogonal to a direction in which the first connecting part 72 extends. Namely, the insulating layer 74 has a ring shape that covers the first connecting part 72 from the radial outer side when its cross-section (transverse section) is viewed.

In addition, in the present embodiment, as shown in FIG. 7, the insulating layer 84 (second added insulating layer 84c) is provided on each of the second bent part 82a and the pair of second diagonal parts 82b. Specifically, the insulating layer 84 (second added insulating layer 84c) is provided on a portion of the second connecting part 82 other than second inclined parts 82c which will be described later.

In addition, the second added insulating layer 84c of the insulating layer 84 provided on the second bent part 82a and the second added insulating layer 84c of the insulating layer 84 provided on each of the pair of second diagonal parts 82b are provided integrally. Specifically, the second added insulating layer 84c is a single insulating layer. In other words, the insulating layer 84 is an insulating layer that is not divided into a plurality of layers and is continuously formed on the second connecting part 82.

In addition, as shown in FIG. 9B, the insulating layer 84 is provided so as to surround the second connecting part 82 in a circumferential manner at a cross-section (transverse section) orthogonal to the second connecting part 82. Namely, the insulating layer 84 has a ring shape that covers the second connecting part 82 from the radial outer side when its cross-section (transverse section) is viewed.

(Configuration of the Inclined Parts)

As shown in FIG. 11, at least some of a plurality of first connecting parts 72 arranged radially are provided with a first inclined part 72c. The first inclined part 72c is provided on an end part 71b side of a first leg part 71. In addition, the first inclined part 72c is inclined toward the radial outer side. The first inclined part 72c is provided between a portion of the first connecting part 72 provided with the insulating layer 74 and the first leg part 71 (end part 71b). Though depiction is omitted, the first inclined part 72c is provided with only the first base insulating layer 74a (see FIG. 9A). Note that the first inclined part 72c is provided on those of a plurality of (eight in the present embodiment) radially arranged first connecting parts 72 other than a first connecting part 72 provided on the radial innermost side. Namely, when taking a look at a cross-section along the radial direction of the slot 12, each of the plurality of first connecting parts 72 other than the first connecting part 72 provided on the radial innermost side is offset toward the radial outer side relative to the first leg part 71. Note that in FIG. 11, for simplification, depiction of the insulating layers 73 is omitted.

As described above, a plurality of (seven in the present embodiment) first inclined parts 72c are arranged in the radial direction. Here, in the present embodiment, a first inclined part 72c provided on the radial outer side has a greater angle of inclination θ1 with respect to the axial direction than a first inclined part 72c provided on the radial inner side. In other words, the angle of inclination θ1 of each of the plurality of first inclined parts 72c arranged radially gradually increases in turn from the first inclined part 72c provided on the radial innermost side.

Figure 12:
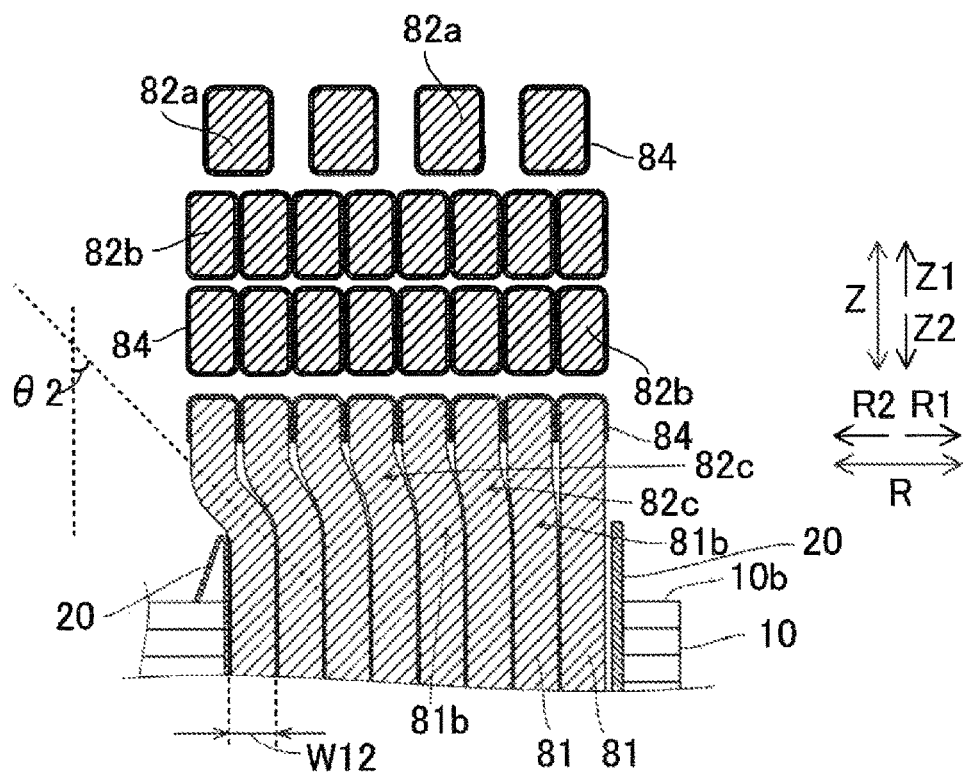
FIG. 12 is a partial enlarged view of a portion near second connecting parts of FIG. 10.

In addition, as shown in FIG. 12, at least some of a plurality of second connecting parts 82 arranged radially are provided with a second inclined part 82c. The second inclined part 82c is provided on an end part 81b side of a second leg part 81. In addition, the second inclined part 82c is inclined toward the radial outer side. The second inclined part 82c is provided between a portion of the second connecting part 82 provided with the insulating layer 84 and the second leg part 81 (end part 81b). Though depiction is omitted, the second inclined part 82c is provided with only the second base insulating layer 84a (see FIG. 9B). Note that the second inclined part 82c is provided on those of a plurality of (eight in the present embodiment) radially arranged second connecting parts 82 other than a second connecting part 82 provided on the radial innermost side. Namely, when taking a look at a cross-section along the radial direction of the slot 12, each of the plurality of second connecting parts 82 other than the second connecting part 82 provided on the radial innermost side is offset toward the radial outer side relative to the second leg part 81. Note that in FIG. 12, for simplification, depiction of the insulating layers 83 is omitted.

As described above, a plurality of (seven in the present embodiment) second inclined parts 82c are arranged in the radial direction. Here, in the present embodiment, a second inclined part 82c provided on the radial outer side has a greater angle of inclination θ2 with respect to the axial direction than a second inclined part 82c provided on the radial inner side. In other words, the angle of inclination θ2 of each of the plurality of second inclined parts 82c arranged radially gradually increases in turn from the second inclined part 82c provided on the radial innermost side. Note that in FIGS. 11 and 12, for simplification, depiction of the joint part insulating members 21 is omitted.

(Configuration of the Joint Parts)

Figure 13:
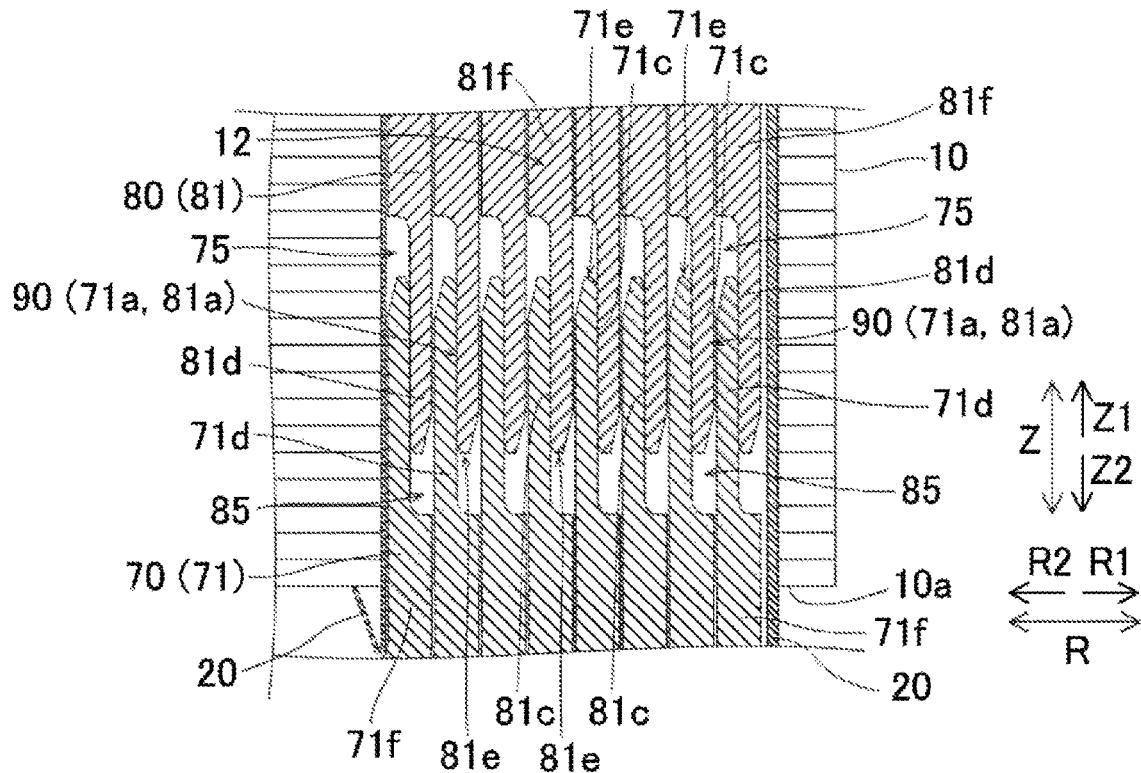
FIG. 13 is a partial enlarged view of a portion near joint parts of FIG. 10.

As shown in FIG. 13, in one slot 12, end parts 71a of a plurality of first conductors 70 (first leg parts 71) and end parts 81a of a plurality of second conductors 80 (second leg parts 81) are joined together. Specifically, each end part 71a includes a first plane disposition part 71d where a first plane 71c extending in the axial direction is provided. In addition, each end part 81a includes a second plane disposition part 81d where a second plane 81c extending in the axial direction is provided. A plurality of first plane disposition parts 71d and a plurality of second plane disposition parts 81d are alternately arranged in the radial direction. Namely, joint parts 90 of a plurality of first leg parts 71 and a plurality of second leg parts 81 are disposed so as to be radially adjacent to each other in one slot 12. Note that in FIG. 13, for simplification, depiction of the joint part insulating members 21 is omitted.

Specifically, in one slot 12, a plurality of joint parts 90 are provided so as to overlap each other as viewed in the radial direction. That is, all joint parts 90 disposed in one slot 12 are disposed side by side in a horizontal direction. In other words, in one slot 12, the axial locations of the plurality of joint parts 90 are substantially equal to each other. Note that as will be described later, the joint part 90 is a portion where the first plane 71c of the first leg part 71 (end part 71a) and the second plane 81c of the second leg part 81 (end part 81a) are joined together (overlap each other) as viewed in the radial direction.

In addition, each of a tip part 71e of the first leg part 71 and a tip part 81e of the second leg part 81 has a tapered shape. Specifically, each of the tip part 71e of the first leg part 71 and the tip part 81e of the second leg part 81 has a tapered shape as viewed in the circumferential direction (A-direction).

In addition, the first leg part 71 has a first leg part main body part 71f provided continuously from the first plane disposition part 71d where the first plane 71c is provided. The first leg part main body part 71f is provided on the opposite side (the Z2-direction side) of the first plane disposition part 71d from the tip part 71e. In addition, the second leg part 81 has a second leg part main body part 81f provided continuously from the second plane disposition part 81d where the second plane 81c is provided. The second leg part main body part 81f is provided on the opposite side (the Z1-direction side) of the second plane disposition part 81d from the tip part 81e.

In addition, between the first conductor 70 and the second conductor 80 that axially face each other, a first clearance part 75 is provided between the tip part 71e of the first leg part 71 and the second leg part 81 (second leg part main body part 81f). In addition, between the first conductor 70 and the second conductor 80 that axially face each other, a second clearance part 85 is provided between the tip part 81e of the second leg part 81 and the first leg part 71 (first leg part main body part 71f).

Here, in the present embodiment, as shown in FIG. 18, a first leg part 71 of each of a plurality of first conductors 70 is disposed so as to be radially adjacent to a first leg part 71 of the same phase. In addition, a second leg part 81 of each of a plurality of second conductors 80 is disposed so as to be adjacent to a second leg part 81 of the same phase. Specifically, as shown in FIG. 13, in one slot 12, a plurality of first leg parts 71 of the same phase are arranged radially and a plurality of second leg parts 81 of the same phase are arranged radially. Specifically, eight first leg parts 71 disposed in one slot 12 are first leg parts 71 of the same phase. In addition, eight second leg parts 81 disposed in one slot 12 are second leg parts 81 of the same phase. In addition, the first leg parts 71 and the second leg parts 81 disposed in one slot 12 are of the same phase. Namely, all of a plurality of first leg parts 72 and a plurality of second leg parts 82 disposed in each of the plurality of slots 12 are of the same phase. In other words, in one slot 12, leg parts (71 and 81) of different phases are not disposed so as to be adjacent to each other. Note that in the plurality of slots 12 provided circumferentially, leg parts (71 and 81) of a different phase are provided every two slots. Namely, in the plurality of slots 12, the leg parts (71 and 81) are provided in order of U-phase, U-phase, V-phase, V-phase, W-phase, W-phase . . . (this cycle is repeated thereafter). Note that the disposition of the leg parts (71 and 81) (the arrangement of the phases) in the plurality of slots 12 is not limited thereto.

(Structure of the Core Leg Part Insulating Members)

As shown in FIG. 4, a core leg part insulating member 20 is disposed between a wall part 11a and teeth 13 and first leg parts 71 and second leg parts 81 (segment conductors 40).

The core leg part insulating member 20 is disposed so as to integrally cover around the plurality of second leg parts 81 disposed radially and parallelly as viewed in the Z2-direction. In other words, both circumferential sides and both radial sides of the plurality of second leg parts 81 disposed radially and parallelly are covered by the core leg part insulating member 20. By this, it becomes possible to ensure insulation between joint parts 90 and the stator core 10 by the core leg part insulating member 20.

(Structure of Joint Part Insulating Members)

Figure 14:
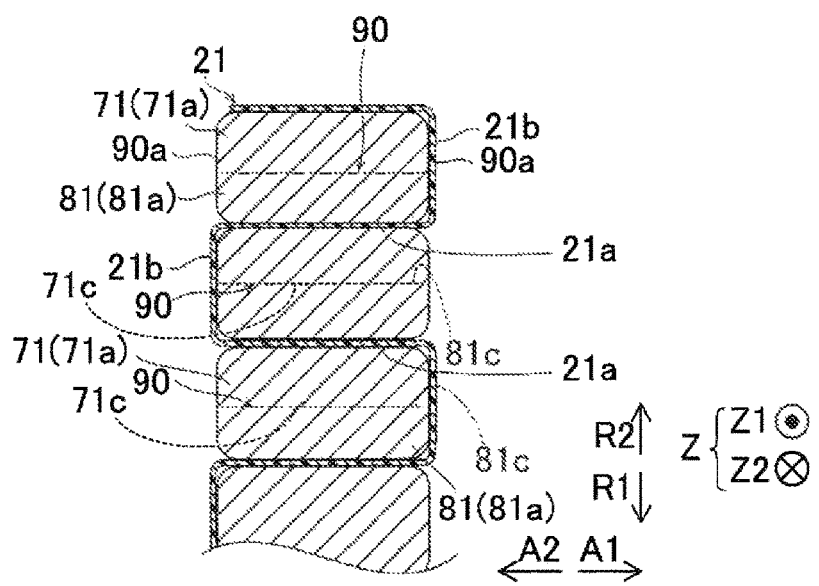
FIG. 14 is a cross-sectional view showing a configuration of the joint part insulating member according to the first embodiment.

In addition, as shown in FIG. 14, of joint parts 90 where an end part 71a (first plane 71c) of a first leg part 71 and an end part 81a (second plane 81c) of a second leg part 81 between coils radially adjacent to each other in one slot 12 are joined together, radially adjacent joint parts 90 are insulated from each other by a sheet-type joint part insulating member 21. The joint part insulating member 21 is provided separately from the core leg part insulating member 20. In addition, the "coil" refers to a linear portion of the coil part 30 disposed in a slot 12 after a first conductor 70 and a second conductor 80 are joined together. Thus, in one slot 12 there are disposed a plurality of coils.

Here, as shown in FIG. 14, the joint part insulating member 21 is formed by, for example, folding one sheet-type insulating member such as Nomex. The joint part insulating member 21 includes facing surface insulating portions 21a each provided between radially adjacent joint parts 90. In addition, the joint part insulating member 21 includes circumferential surface insulating portions 21b each continuing from both circumferential end parts of a facing surface insulating portion 21a and covering either one of circumferential surfaces 90a of radially adjacent joint parts 90 by at least an amount corresponding to insulation distance. Note that the insulation distance refers to a length in the radial direction of the circumferential surface insulating portion 21b, and a distance (creepage distance) sufficient for insulation between radially adjacent joint parts 90.

Figure 15:
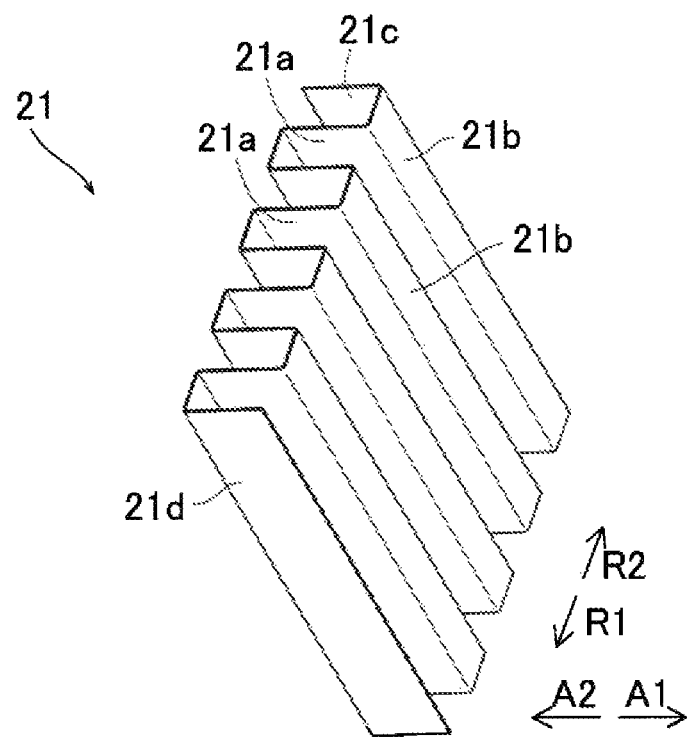
FIG. 15 is a perspective view showing a configuration of the joint part insulating member according to the first embodiment.

Note that as shown in FIG. 15, the joint part insulating member 21 includes a portion 21c that covers a radial outer side of a joint part 90 disposed on the radial outermost side. In addition, the joint part insulating member 21 includes a portion 21d that covers a radial inner side of a joint part 90 disposed on the radial innermost side.

In addition, in the joint part insulating member 21, facing surface insulating portions 21a radially adjacent to each other are connected by a circumferential surface insulating portion 21b on one or other circumferential side. Specifically, a facing surface insulating portion 21a on the radial outer side which is one of a pair of facing surface insulating portions 21a disposed so as to be radially adjacent to each other, a circumferential surface insulating portion 21b provided on one circumferential side, a facing surface insulating portion 21a on the radial inner side which is the other one of the pair of facing surface insulating portions 21a, and a circumferential surface insulating portion 21b provided on the other circumferential side are formed in a continuous manner. That is, a circumferential surface 90a on an A1-direction side of a joint part 90 and a circumferential surface 90a on an A2-direction side of a joint part 90 are alternately covered by circumferential surface insulating portions 21b. In other words, the joint part insulating member 21 is configured not to continuously cover circumferential surfaces 90a of a plurality of joint parts 90 disposed so as to be adjacent to each other in the radial direction.

As such, the joint part insulating member 21 has a meander shape (bellows shape) as viewed in the axial direction. In addition, since radially adjacent joint parts 90 disposed in one slot 12 are insulated from each other by one joint part insulating member 21, all joint parts 90 in the slot 12 are insulated from each other. By this, compared to a case in which a plurality of joint parts 90 disposed in one slot 12 are individually covered by insulating members, the number of processes for disposing a joint part insulating member 21 can be reduced.

In addition, the joint part insulating member 21 is configured to be extendable in the radial direction. This is because the joint part insulating member 21 is made of a sheet-type insulating member having flexibility, and is configured not to continuously cover circumferential surfaces 90a of a plurality of joint parts 90 disposed so as to be adjacent to each other in the radial direction. By this, upon joining together a first leg part 71 and a second leg part 81, even if the first leg part 71 and the second leg part 81 are pressed in the radial direction or the axial direction, a joint part insulating member 21 can be deformed with movement of the first leg part 71 and the second leg part 81.

Here, in the present embodiment, each of the core leg part insulating member 20 and the joint part insulating member 21 is provided separately from the insulating layer 74 and the insulating layer 84. In addition, each of the core leg part insulating member 20 and the joint part insulating member 21 is provided so as to be axially separated from the insulating layer 74 and the insulating layer 84.

Figure 16:
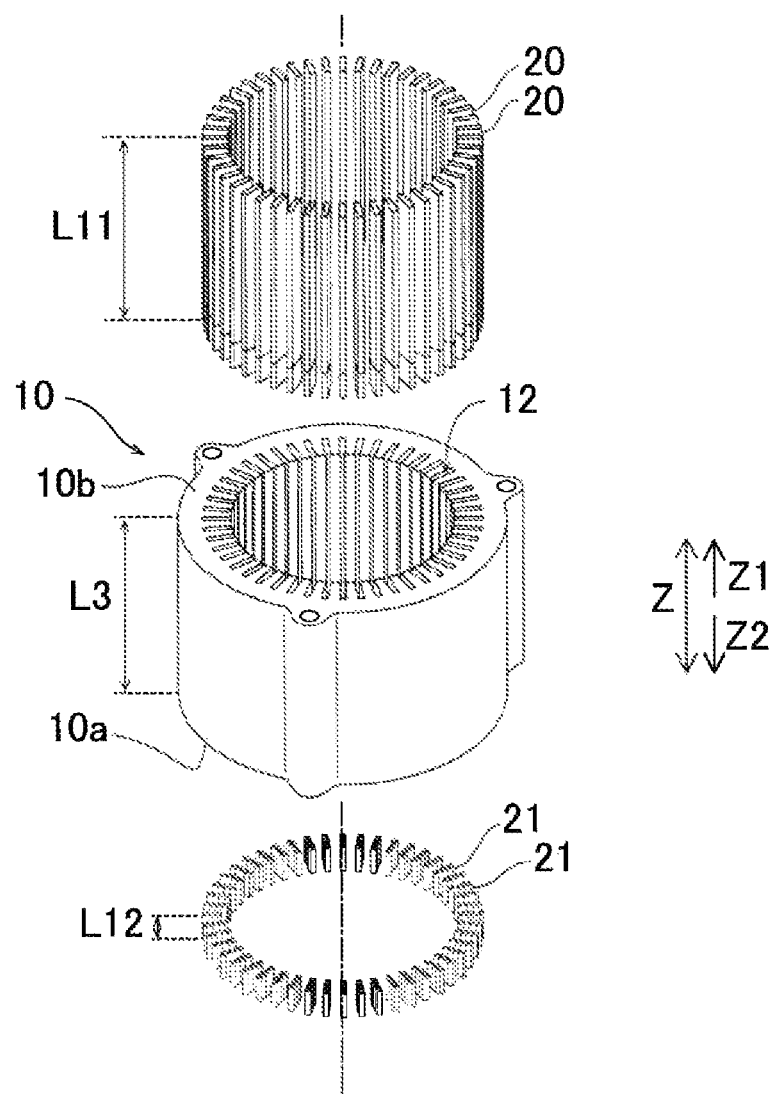
FIG. 16 is an exploded perspective view in which the stator core, the core leg part insulating members, and the joint part insulating members according to the first embodiment are separated.

In addition, as shown in FIG. 16, in the axial direction, a length L12 of the joint part insulating members 21 is smaller than a length L11 of the core leg part insulating members 20. Specifically, the length L11 of the core leg part insulating members 20 is larger than the axial length L3 of the stator core 10. In addition, the length L12 of the joint part insulating members 21 is smaller than the length L3 of the stator core 10. In addition, the joint part insulating members 21 are provided so as to cover the joint parts 90 and to extend toward the Z1-direction side and the Z2-direction side from the joint parts 90. The length L12 of the joint part insulating members 21 is adjusted based on, for example, the magnitude of a voltage applied to the coil part 30 (based on a required creepage distance). Note that in FIG. 16 depiction of the first conductors 70 and the second conductors 80 is omitted for simplification.

(Method of Manufacturing the Stator)

Next, with reference to FIG. 17, a method of manufacturing the stator 100 will be described.

(Process of Preparing Segment Conductors and Process of Forming Added Insulating Layers)

Figure 17:
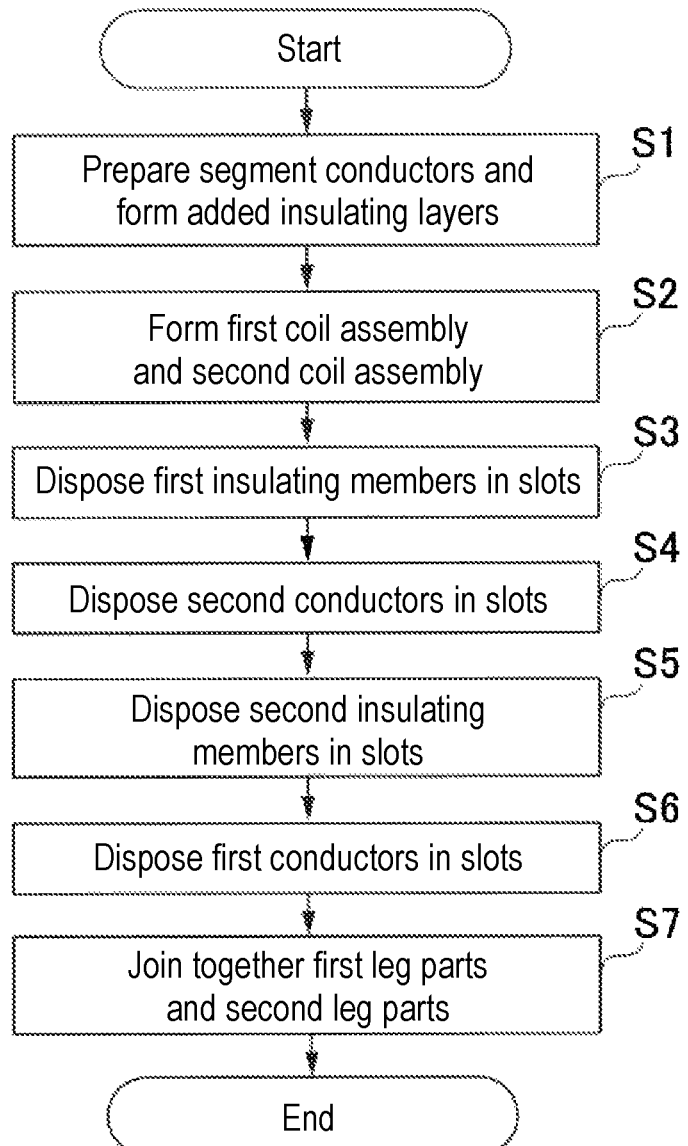
FIG. 17 is a flowchart for describing a method of manufacturing the stator according to the first embodiment.

First, as shown in FIG. 17, at step S1, a plurality of segment conductors 40 are prepared. Specifically, there are prepared power conductors 50 that form power-line connection end parts Pt for each phase of a Y-connected coil part 30; neutral point conductors 60 that form neutral-point connection end parts Nt for each phase of the coil part 30; and first conductors 70 and second conductors 80 that form other portions of the coil part 30.

For example, as shown in FIGS. 8A and 9A, an insulating layer 73 and a first base insulating layer 74a are formed (coated) on a conductor surface 70a of a first conductor 70 made of a conductive material such as copper. Note that the insulating layer 73 and the first base insulating layer 74a are integrally formed insulating layers. Namely, the insulating layer 73 and the first base insulating layer 74a are formed in the same process.

In addition, as shown in FIGS. 8B and 9B, an insulating layer 83 and a second base insulating layer 84a are formed (coated) on a conductor surface 80a of a second conductor 80 made of a conductive material such as copper. Note that the insulating layer 83 and the second base insulating layer 84a are integrally formed insulating layers, and thus, the insulating layer 83 and the second base insulating layer 84a are formed in the same process.

Then, the first conductors 70 and the second conductors 80 are shaped by a forming jig (not shown), by which first conductors 70 (FIG. 6), second conductors 80 (FIG. 7), and second leg parts 81 that form a part of power conductors 50 or a part of neutral point conductors 60 are formed.

Upon the formation, by a forming jig (not shown), first inclined parts 72c are formed in each of the first conductors 70 and second inclined parts 82c are formed in each of the second conductors 80. Specifically, the first conductors 70 and the second conductors 80 are formed such that the angle of inclination θ1 (θ2) of a first inclined part 72c (second inclined part 82c) provided on the radial outer side is greater than the angle of inclination θ1 (θ2) of a first inclined part 72c (second inclined part 82c) provided on the radial inner side.

Then, as shown in FIGS. 9A and 9B, a first added insulating layer 74c is formed (coated) on a surface 74b of the first base insulating layer 74a, and a second added insulating layer 84c is formed (coated) on a surface 84b of the second base insulating layer 84a. Specifically, possible techniques for forming the first added insulating layer 74c and the second added insulating layer 84c include, for example, a method in which a first connecting part 72 (second connecting part 82) is immersed in a liquid insulating material, a method in which an insulating material is applied to a first connecting part 72 (second connecting part 82) by spraying, etc., a method in which heat-shrink tubing is placed on a first connecting part 72 (second connecting part 82), and a method in which an insulating tape is wound around a first connecting part 72 (second connecting part 82).

(Formation of a First Coil Assembly and a Second Coil Assembly)

Next, at step S2, a first coil assembly 30a (see FIG. 2) and a second coil assembly 30b (see FIG. 2) each having an annular shape and including a plurality of segment conductors 40 are formed. The first coil assembly 30a and the second coil assembly 30b are formed such that a plurality of (e.g., eight) segment conductors 40 are disposed radially and parallelly and sets of a plurality of segment conductors 40 whose number is equal to the number of slots 12 are disposed circumferentially and parallelly. The power conductors 50 and the neutral point conductors 60 are disposed in the second coil assembly 30b.

(Process of Disposing Core Leg Part Insulating Members in the Slots)

Next, at step S3, sheet-type core leg part insulating members 20 for insulating the slots 12 from the coil part 30 are inserted into the slots 12.

(Process of Disposing the Second Conductors in the Slots)

Next, at step S4, the second leg parts 81 of the plurality of second conductors 80 disposed on one axial side (Z1-direction side) of the stator core 10 among the plurality of segment conductors 40 are inserted into the slots 12 of the stator core 10 from one axial side (Z1-direction side) of the stator core 10. By this, the plurality of second conductors 80 are disposed on one axial side (Z1-direction side) of the stator core 10.

(Process of Disposing Joint Part Insulating Members)

Next, at step S5, after disposing the plurality of second conductors 80 in the slots 12, a sheet-type joint part insulating member 21 is disposed between second leg parts 81 of second conductors 80 radially adjacent to each other in one slot 12 among the plurality of second conductors 80.

(Process of Disposing the First Conductors in the Slots)

Next, at step S6, the plurality of first conductors 70 are allowed to move relative to the stator core 10 from the other axial side (Z2-direction side) of the stator core 10. By this, first leg parts 71 of the first conductors 70 are inserted into the slots 12. By this, the plurality of first conductors 70 are disposed on the other axial side (Z2-direction side) of the stator core 10.

In addition, the first leg parts 71 of the first conductors 70 and the second leg parts 81 of the second conductors 80 are disposed in the slots 12 such that end parts 71a of the first leg parts 71 and end parts 81a of the second leg parts 81 are alternately disposed in all slots 12. At this time, upon inserting a first leg part 71 of a first conductor 70, the first leg part 71 is inserted by tilting the first leg part 71 toward the radial inner side or shifting the first leg part 71 toward the radial outer side, by which interference between the first leg part 71 and a second leg part 81 can be easily avoided.

(Process of Joining Together the First Leg Parts and the Second Leg Parts)

Next, at step S7, by radially pressing the plurality of segment conductors 40 (the end parts 71a and the end parts 81a), first planes 71c of the first leg parts 71 and second planes 81c of the second leg parts 81 are joined together.

Second Embodiment

Next, with reference to FIGS. 1, 3, and 19 to 25, a stator 200 according to a second embodiment will be described. In the stator 200 of the second embodiment, unlike the above-described first embodiment, first leg parts 171 and second leg parts 181 are not provided with insulating layers. Note that the same components as those of the above-described first embodiment are shown in the drawings, given the same reference signs as those of the first embodiment, and description thereof is omitted.

[Structure of the Stator]

With reference to FIGS. 1, 3, and 19 to 24, a structure of the stator 200 according to the second embodiment will be described. Note that the stator 200 is an example of an "armature" in the claims.

Figure 19:
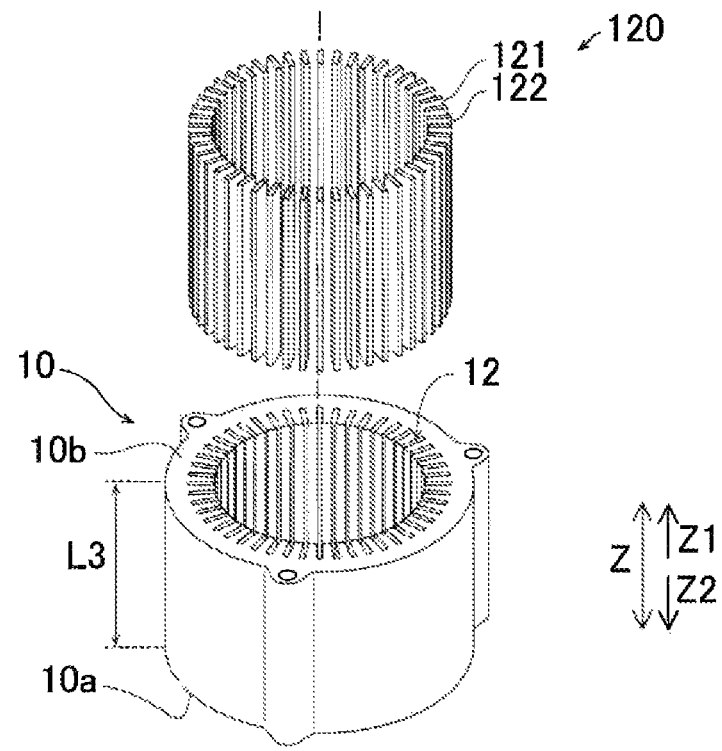
FIG. 19 is an exploded perspective view of a stator according to the second embodiment.

As shown in FIG. 1, the stator 200 together with the rotor 101 forms a part of a rotating electrical machine 202. In addition, as shown in FIG. 19, the stator 200 includes sheet-type insulating members 120 and a coil part 130 (see FIG. 1). In addition, the coil part 130 includes a first coil assembly 130a (counter-lead side coils) (see FIG. 21) and a second coil assembly 130b (lead side coils) (see FIG. 21). In addition, the coil part 130 includes a plurality of segment conductors 140 (see FIG. 20).

<Structures of First Conductors and Second Conductors>

Figure 20:
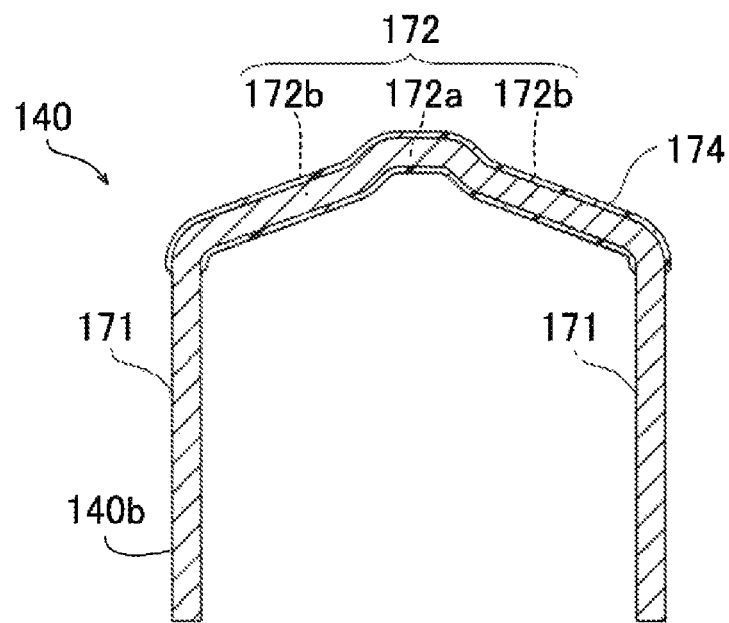
FIG. 20 is a cross-sectional view of a segment conductor according to the second embodiment.

As shown in FIG. 20, each of first conductors 170 of a plurality of phases includes a pair of first leg parts 171 and a first connecting part 172. The first connecting part 172 has a first bent part 172a and a pair of first diagonal parts 172b. Note that though depiction of second conductors 180 of a plurality of phases is omitted in FIG. 20 because they have the same configuration as the first conductors 170, each of the second conductors 180 of a plurality of phases includes a pair of second leg parts 181 (see FIG. 21) and a second connecting part 182 (see FIG. 21). In addition, the second connecting part 182 has a second bent part 182a (see FIG. 21) and a pair of second diagonal parts 182b (see FIG. 21). The first leg part 171 and the second leg part 181 have a substantially equal length (see FIG. 21).

Here, in the second embodiment, the insulation performance of the first connecting parts 172 and the second connecting parts 182 is higher than the insulation performance of the first leg parts 171 and the second leg parts 181. Specifically, a pair of first leg parts 171 (second leg parts 181) of a segment conductor 140 is not provided with an insulating layer. Namely, the first leg parts 171 (second leg parts 181) are not covered with an insulating layer, and a conductor surface 140b is exposed.

Each of at least a portion of a first connecting part 172 where first connecting parts 172 of different phases are disposed so as to be adjacent to each other, and at least a portion of a second connecting part 182 where second connecting parts 182 of different phases are disposed so as to be adjacent to each other is provided with an insulating layer. Specifically, each of a first bent part 172*a* and a pair of first diagonal parts 172*b* of a first connecting part 172 is covered with an insulating layer 174. In addition, each of a second bent part 182*a* and a pair of second diagonal parts 182*b* of a second connecting part 182 is covered with an insulating layer 184 (see FIG. 21). Note that although FIG. 20 only shows the first conductor 170, the second conductor 180 is also the same and thus depiction thereof is omitted.

Figure 21:
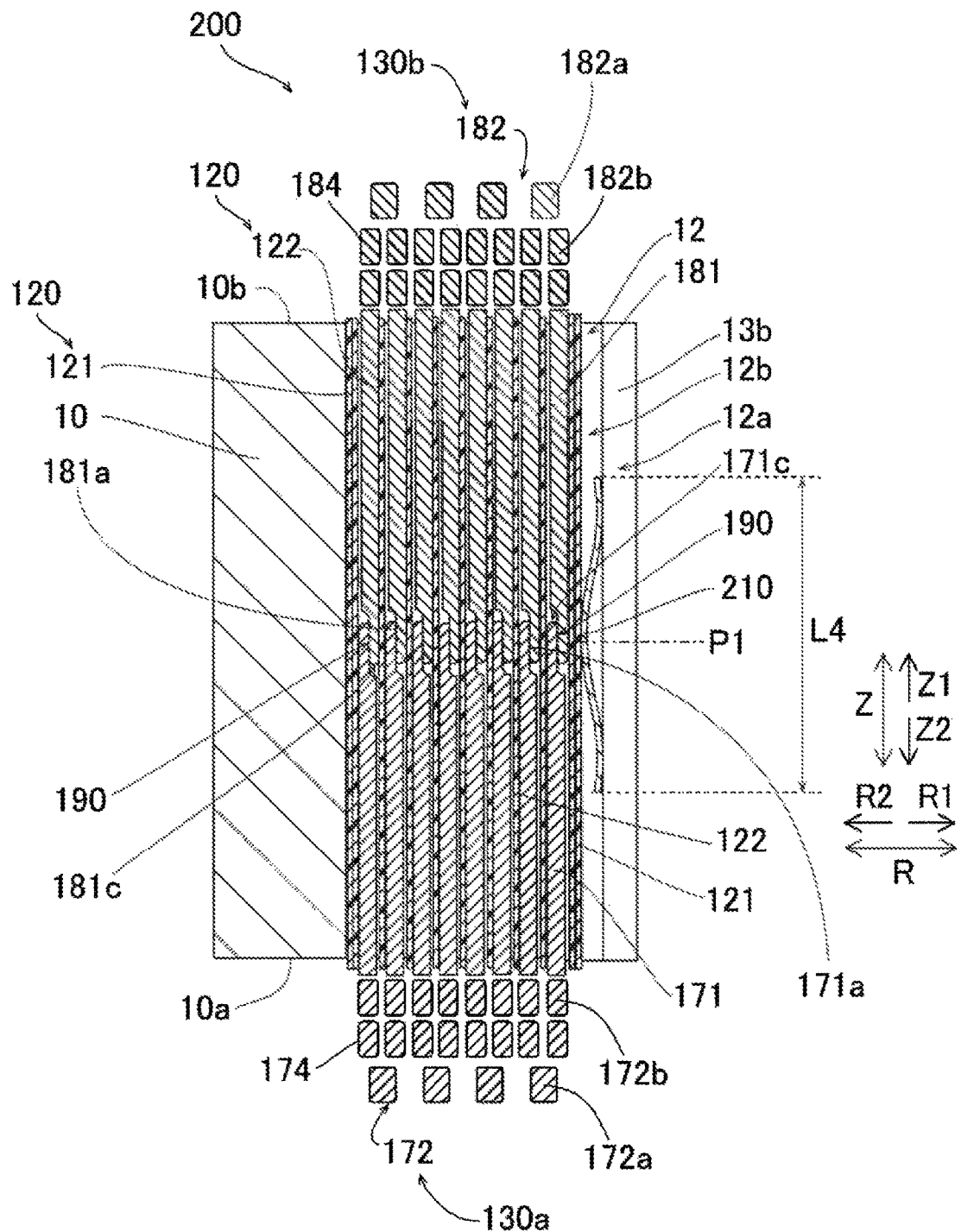
FIG. 21 is a cross-sectional view of the inside of a slot taken along a radial direction according to the second embodiment.

In addition, as shown in FIG. 21, the stator 200 includes, in each of a plurality of slots 12, a plate spring member 210 provided so as to be sandwiched between the coil part 130 and an opening part 12*a* (projecting parts 13*b*) of the slot 12. Namely, the plate spring member 210 is provided in an end space 12*b* provided on the radial inner side in the slot 12. The plate spring member 210 is made of a plate spring member that is deflectable in the R-direction. The plate spring member 210 is configured to maintain a contact state of contact parts 190 which will be described later, by pressing the coil part 130 from an R1-side.

In addition, the plate spring member 210 has a plate spring shape that bends in the Z-direction. Specifically, in the plate spring member 210, a metal plate of, for example, SUS (stainless steel) that extends in the Z-direction bends in the Z-direction. The plate spring member 210 has a length L4 in the Z-direction smaller than a length L3 in the Z-direction of the stator core 10 (see FIG. 19). Note that it is preferred that the plate spring member 210 be made of a material (e.g., Inconel®) that has a biasing force (elastic force) and is a non-magnetic material and has heat resistance.

The plate spring member 210 is configured to press the coil part 130 from the radial inner side so that a first plane 171*a* of a first leg part 171 of a first conductor 170 comes into contact with a second plane 181*a* of a second leg part 181 of a second conductor 180. By the first plane 171*a* of the first leg part 171 coming into contact with the second plane 181*a* of the second leg part 181, a contact part 190 is formed. Note that the contact part 190 is an example of a "joint part" in the claims.

The first plane 171*a* and the second plane 181*a* come into contact with each other by being pressed by the plate spring member 210 without any binder between the first plane 171*a* and the second plane 181*a*. Namely, the first plane 171*a* and the second plane 181*a* are not joined together, and a contact state between the first plane 171*a* and the second plane 181*a* is maintained by a pressing force of the plate spring member 210.

In addition, each of a plurality of contact parts 190 is disposed at a central part P1 in the axial direction of the stator core 10 in a slot 12. In addition, the plate spring member 210 is also disposed at the central part P1 in the axial direction of the stator core 10. Specifically, the plate spring member 210 is provided so as to overlap each of the plurality of contact parts 190 as viewed in the radial direction.

In addition, each of the first plane 171*a* and the second plane 181*a* is subjected to a plating process. Namely, the planes (the first plane 171*a* and the second plane 181*a*) having been subjected to the plating process are in contact with each other.

In addition, in the plating process, metals, e.g., Ni, Ag, Au, and Sn, are used. Note that the plating process may be performed using a plurality of metals (e.g., Ni and Ag) among the above-described metals.

Figure 22:
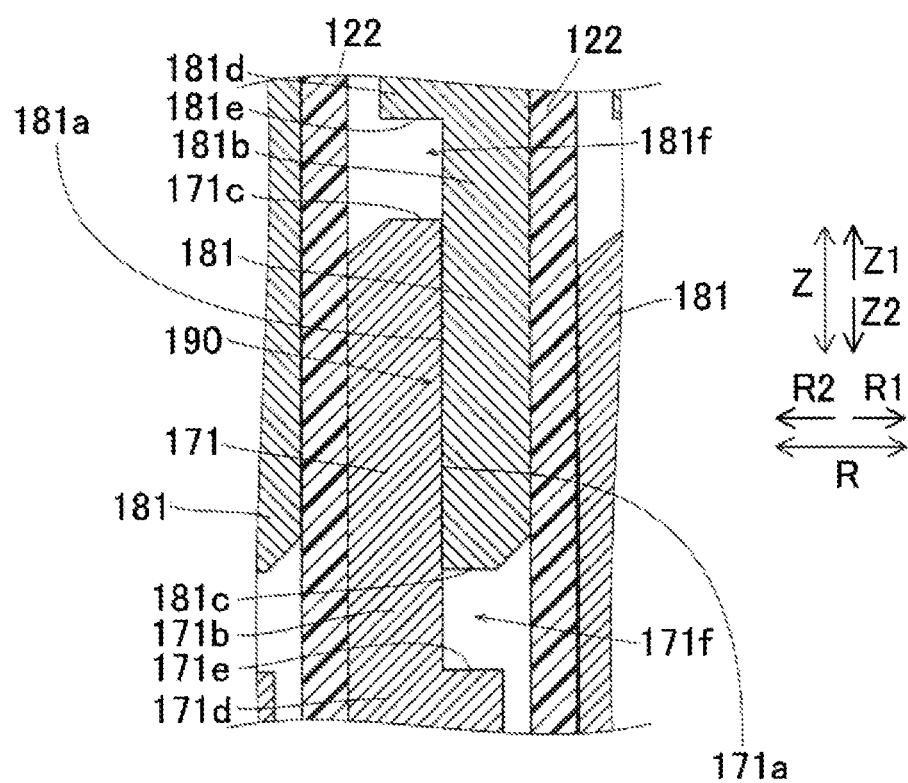
FIG. 22 is an enlarged partial view of a portion near a contact part of FIG. 21.

As shown in FIG. 22, a first leg part 171 includes a first plane disposition part 171*b*, a tip part 171*c*, a first leg part main body part 171*d*, and a first step part 171*e*. A clearance part 171*f* is provided between the first step part 171*e* and a tip part 181*c* of a second leg part 181.

In addition, the second leg part 181 includes a second plane disposition part 181*b*, the tip part 181*c*, a second leg part main body part 181*d*, and a second step part 181*e*. A clearance part 181*f* is provided between the second step part 181*e* and the tip part 171*c* of the first leg part 171.

In addition, the first plane disposition part 171*b* and the second plane disposition part 181*b* are provided at the central part P1 in the axial direction of the stator core 10 (see FIG. 21).

In addition, the stator 200 includes insulating members 120. Each insulating member 120 includes an insulating layer made of a polyphenylene sulfide (PPS) resin, aramid paper, etc. The insulating member 120 is formed in sheet form. The insulating member 120 includes a first insulating part 121 for electrically insulating the stator core 10 from the coil part 130; and a second insulating part 122 for electrically insulating segment conductors 140 whose leg parts (171 and 181) are inserted into the same slot 12 from each other.

Figure 23:
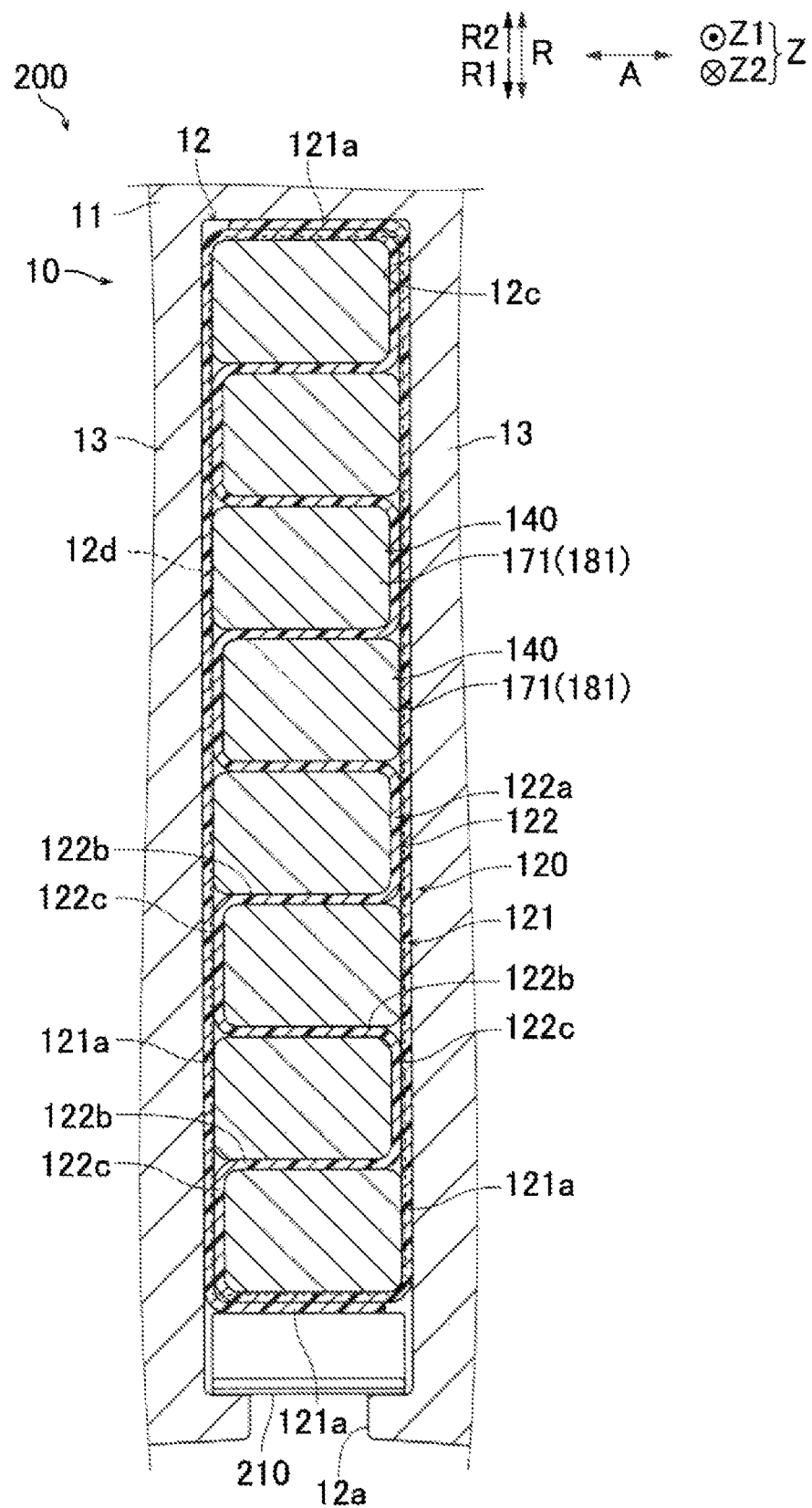
FIG. 23 is a cross-sectional view showing a configuration of an insulating member according to the second embodiment.

As shown in FIG. 23, the first insulating part 121 is provided at least between an inner surface 12*c* of a slot 12 and leg parts (171 and 181) in the slot 12. Specifically, the first insulating part 121 includes a portion 121*a* that linearly extends around a region 12*d* where all segment conductors 140 in the slot 12 are disposed. The linearly extending portion 121*a* is disposed so as to surround almost the entire region 12*d*.

The second insulating part 122 is provided at least between a plurality of leg parts (171 and 181) inserted into the same slot 12 in the slot 12. Specifically, the second insulating part 122 includes a portion 122*a* having a meander shape and provided all the way from a segment conductor 140 disposed on the R1-side to a segment conductor 140 disposed on the R2-side in the same slot 12. The portion 122*a* having a meander shape meanders in each of segment conductors 140 adjacent to each other in the R-direction, so as to extend in the A-direction of the stator core 10 between the segment conductors 140 and extend in the R-direction between the segment conductors 140 and the inner surface 12*c* of the slot 12. Namely, the portion 122*a* having a meander shape includes portions 122*b* each extending in the A-direction of the stator core 10 between segment conductors 140; and portions 122*c* each extending in the R-direction between a segment conductor 140 and the inner surface 12*c* of the slot 12. A portion 122*b* and a portion 122*c* disposed on one side of the A-direction and a portion 122*b* and a portion 122*c* disposed on the other side of the A-direction are continuously formed in this order from the R1-side to the R2-side. The second insulating part 122 is integrally formed with the first insulating part 121 by connecting the portion 122*a* having a meander shape to the linearly extending portion 121*a* of the first insulating part 121.

Figure 24:
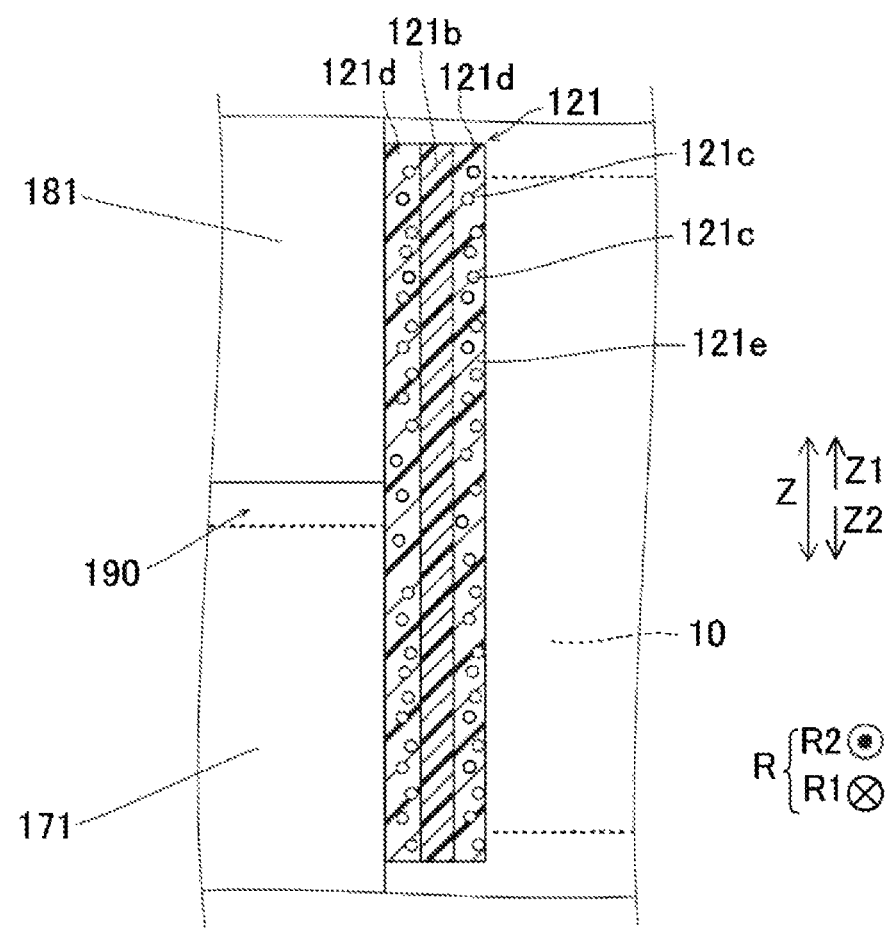
FIG. 24 is a cross-sectional view showing configurations of an insulating layer and fixing layers of the insulating member according to the second embodiment.

In addition, as shown in FIG. 24, the first insulating part 121 includes an insulating layer 121*b*. In addition, the first insulating part 121 includes fixing layers 121*d* having blowing agents 121*c* that form foam by heat. The fixing layers 121*d* expand by formation of foam by the blowing agents 121*c*, by which each of the first leg parts 171 and the second leg parts 181 is fixed to the stator core 10 at least in the axial direction. The fixing layers 121*d* of the first insulating part 121 are configured to bond and fix together each of the first leg parts 171 and the second leg parts 181 and the stator core 10. The fixing layers 121*d* are provided on both surfaces of the insulating layer 121*b*. When the fixing layers 121*d* are heated, thermosetting resins 121*e* are cured. By this, there is no need to use varnish, etc., to fix each of the first leg parts 171 and the second leg parts 181. In addition, in FIG. 24, to show the first insulating part 121 in an exaggerated manner, the first insulating part 121 is shown having a larger thickness than an actual thickness. In addition, in FIG. 24, depiction of the stator core 10, etc., is omitted for simplification. In addition, though depiction is omitted, the second insulating part 122 also has the same configuration (composition) as the first insulating part 121.

(Process of Manufacturing the Stator)

Next, with reference to FIG. 25, a method (process) of manufacturing the stator 200 will be described.

Figure 25:
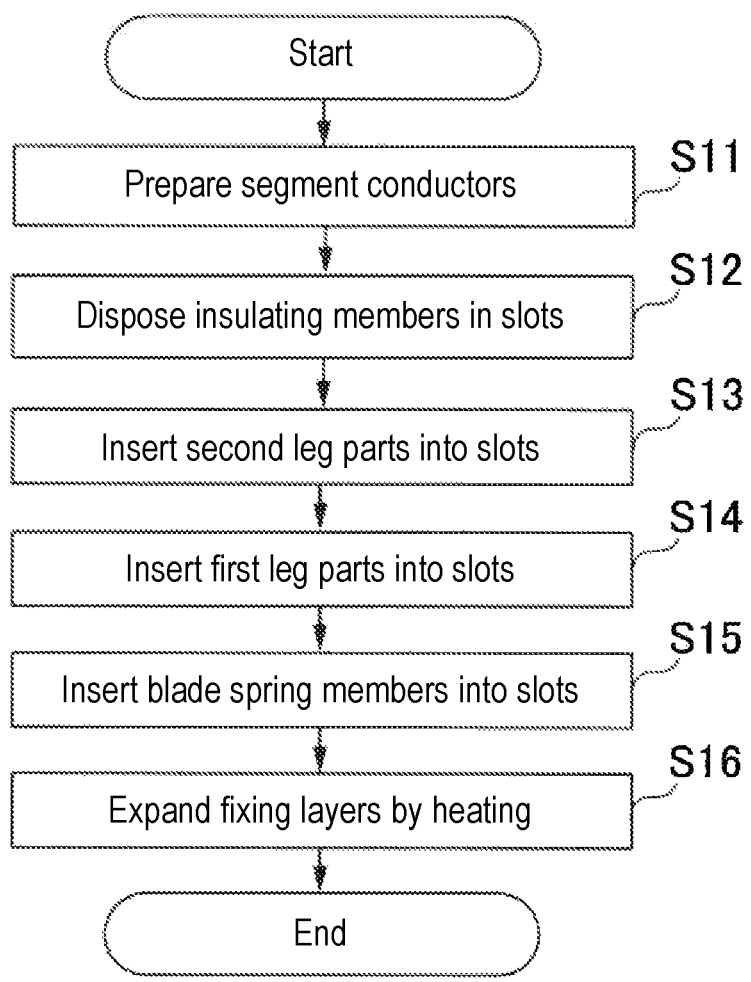
FIG. 25 is a flowchart showing a method of manufacturing the stator according to the second embodiment.

As shown in FIG. 25, first, at step S11, a process of preparing segment conductors 140 is performed. Specifically, insulating layers are not provided on first leg parts 171 (second leg parts 181), and insulating layers (174, 184) are formed on first connecting parts 172 (second connecting parts 182) of first conductors 170 (second conductors 180).

Then, at step S12, insulating members 120 are disposed (inserted) in slots 12.

Then, at step S13, the second leg parts 181 of the second conductors 180 (see FIG. 21) are inserted into the slots 12 from the other axial side (Z1-direction side).

Then, at step S14, the first leg parts 171 of the first conductors 170 (see FIG. 21) are inserted into the slots 12 from one axial side (Z2-direction side). Upon the insertion, each first leg part 171 is disposed such that a first plane 171*a* of the first leg part 171 and a second plane 181*a* of a second leg part 181 face each other.

Then, at step S15, a plate spring member 210 (see FIG. 21) is inserted into an end space 12*b* in a slot 12 from one axial side (e.g., the Z1-direction side).

Then, at step S16, a stator core 10 is heated and fixing layers 121*d* are heated, by which blowing agents 121*c* form foam and the fixing layers 121*d* expand. By this, a coil part 130 is fixed to the slots 12 at least in the axial direction.

[Advantageous Effects of the First and Second Embodiments]

In the present embodiments, the following advantageous effects can be obtained.

In the first and second embodiments, as described above, in an armature (100, 200), a first connecting part (72, 172) and a second connecting part (82, 182) have a higher insulatable voltage value than a first leg part (71, 171) and a second leg part (81, 181). By this, each of the first connecting part (72, 172) and the second connecting part (82, 182) can be more securely insulated.

In addition, before joining together a first leg part (71, 171) and a second leg part (81, 181), a first segment conductor (70, 170) and a second segment conductor (80, 180) are provided separately (detached) from each other. In this case, by moving the first segment conductor (70, 170) to one axial side (a direction side on which the first leg part (71, 171) is provided with respect to a first connecting part (72, 172)) and moving the second segment conductor (80, 180) to the other axial side (a direction side on which the second leg part (81, 181) is provided with respect to a second connecting part (82, 182)), the first leg part (71, 171) and the second leg part (81, 181) are disposed so as to be close to each other and are joined together. By this, without inserting each of the first connecting part (72, 172) and the second connecting part (82, 182) into a slot (12) in the axial direction, the first leg part (71, 171) and the second leg part (81, 181) can be brought close to each other and can be joined together. As a result, since there is no passing of a connecting part (72, 82, 172, 182) through a slot (12), damage to a connecting part (72, 82, 172, 182) having been subjected to an insulation process (formation of an insulating layer (74, 84, 174, 184)) to improve insulation performance (insulatable voltage value) (damage to the insulating layer (74, 84, 174, 184)) can be prevented.

In addition, unlike a case in which at least one of a first connecting part (72, 172) and a second connecting part (82, 182) is inserted into a slot (12) in the axial direction, segment conductors (40, 140) can be disposed in slots (12), with first connecting parts (72, 172) (second connecting parts (82, 182)) joined together in advance. Namely, there is no need to join together first connecting parts (72, 172) (second connecting parts (82, 182)) by a joining process such as welding after disposing segment conductors (40, 140) in slots (12). By this, damage to the connecting parts (72, 82, 172, 182) (damage to insulating layers (74, 84, 174, 184)) caused by the joining process can be prevented.

As a result of the above, when segment conductors (40, 140) are disposed in an armature core (10) in the axial direction, connecting parts (72, 82, 172, 182) can be more securely insulated from each other, and damage to the connecting parts (72, 82, 172, 182) having been subjected to an insulation process (damage to insulating layers (74, 84, 174, 184)) can be prevented.

In addition, in the first embodiment, as described above, each of a pair of first leg parts (71) is provided with a first-leg-part-side insulating layer (73), and each of a pair of second leg parts (81) is provided with a second-leg-part-side insulating layer (83). In addition, at least a portion of a first connecting part (72) where first connecting parts (72) of different phases are disposed so as to be adjacent to each other is provided with a first-connecting-part-side insulating layer (74) larger in thickness than the first-leg-part-side insulating layer (73). In addition, at least a portion of a second connecting part (82) where second connecting parts (82) of different phases are disposed so as to be adjacent to each other is provided with a second-connecting-part-side insulating layer (84) larger in thickness than the second-leg-part-side insulating layer (83). By such a configuration, compared to a case in which at least one of a first connecting part (72) and a second connecting part (82) is inserted into a slot (12) in the axial direction, an increase in the axial opening area of the slot (12) can be prevented, and an increase in the size of the armature core (10) can be prevented. By this, in a case in which a first segment conductor (70) and a second segment conductor (80) are disposed in the armature core (10) in the axial direction, even when the thickness (t3+t4) of a first-connecting-part-side insulating layer (74) is larger than the thickness (t1) of a first-leg-part-side insulating layer (73) and the thickness (t5+t6) of a second-connecting-part-side insulating layer (84) is larger than the thickness (t2) of a second-leg-part-side insulating layer (83), compared to a case in which at least one of a first connecting part (72) and a second connecting part (82) is inserted into a slot (12) in the axial direction, an increase in the size of the armature core (10) can be prevented.

In addition, since a first leg part (71) and a second leg part (81) can be brought close to each other without inserting each of a first connecting part (72) and a second connecting part (82) into a slot (12), there is no need to insert a coil part (30) from the radial inner side. As a result, insulating layers (74, 84) of the connecting parts (72, 82) can be prevented from getting damaged by pressing from the radial inner side upon insertion from the radial inner side. Furthermore, a clearance between radially adjacent connecting parts (72, 82) which is created to form an added insulating layer (74c, 84c) can be prevented from being removed by pressing from the radial inner side upon insertion from the radial inner side. In addition, by axially moving each of first segment conductors (70) and second segment conductors (80), there is no need to use a plurality of circumferentially divided armature cores (10) and to dispose leg parts (71, 81) in slots (12) by radially moving the divided armature cores (10). As a result, compared to a case in which the armature core (10) is divided, losses in the armature core (10) (e.g., iron losses caused by an increase in magnetic reluctance) can be prevented from getting worse.

In addition, since a first leg part (71) and a second leg part (81) can be brought close to each other without inserting each of a first connecting part (72) and a second connecting part (82) into a slot (12), there is no need to increase the top-view area of the slot (12). As a result, the physical size of the armature core (10) can be prevented from increasing and losses in the armature (10) can be prevented from getting worse.

In addition, in the first embodiment, as described above, a first-connecting-part-side insulating layer (74) includes a first base insulating layer (74a) which is integrally formed with a first-leg-part-side insulating layer (73) and has a thickness (t3) equal to the thickness (t1) of the first-leg-part-side insulating layer (73); and a first added insulating layer (74c) provided on a surface (74b) of the first base insulating layer (74a). In addition, a second-connecting-part-side insulating layer (84) includes a second base insulating layer (84a) which is integrally formed with a second-leg-part-side insulating layer (83) and has a thickness (t5) equal to the thickness (t2) of the second-leg-part-side insulating layer (83); and a second added insulating layer (84c) provided on a surface (84b) of the second base insulating layer (84a). By such a configuration, the thickness (t3+t4) of the first-connecting-part-side insulating layer (74) can be easily made larger by the thickness (t4) of the first added insulating layer (74c) than the thickness (t1) of the first-leg-part-side insulating layer (73). In addition, the thickness (t5+t6) of the second-connecting-part-side insulating layer (84) can be easily made larger by the thickness (t6) of the second added insulating layer (84c) than the thickness (t2) of the second-leg-part-side insulating layer (83). As a result, while disposition of first segment conductors (70) and second segment conductors (80) in the armature core (10) is facilitated, adjacent first connecting parts (72) and adjacent second connecting parts (82) can be more securely and easily insulated from each other.

In addition, in the first embodiment, as described above, in one slot (12), a plurality of first leg parts (71) are arranged radially and a plurality of second leg parts (81) are arranged radially. In addition, a plurality of first connecting parts (72) are arranged radially on the other axial side of the slot (12). In addition, a plurality of second connecting parts (82) are arranged radially on one axial side of the slot (12). In addition, at least some of the plurality of radially arranged first connecting parts (72) each are provided with a first inclined part (72c) inclined toward one radial side between a portion of the first connecting part (72) where a first-connecting-part-side insulating layer (74) is provided and a first leg part (71). In addition, at least some of the plurality of radially arranged second connecting parts (82) each are provided with a second inclined part (82c) inclined toward one radial side between a portion of the second connecting part (82) where a second-connecting-part-side insulating layer (84) is provided and a second leg part (81). By such a configuration, by providing the first inclined part (72c), the first connecting part (72) can be disposed so as to be shifted toward one radial side with respect to the first leg part (71). In addition, by providing the second inclined part (82c), the second connecting part (82) can be disposed so as to be shifted toward one radial side with respect to the second leg part (81). As a result, the size of a clearance between radially adjacent first connecting parts (71) can be easily adjusted by the angle of inclination ($\theta1$) of the first inclined part (72c). In addition, the size of a clearance between radially adjacent second connecting parts (82) can be easily adjusted by the angle of inclination ($\theta2$) of the second inclined part (82c).

In addition, in the first embodiment, as described above, each of a plurality of first inclined parts (72c) and a plurality of second inclined parts (82c) is arranged radially. In addition, a first inclined part (72c) provided on one radial side has a greater angle of inclination ($\theta1$) with respect to the axial direction than a first inclined part (72c) provided on the other radial side. In addition, a second inclined part (82c) provided on one radial side has a greater angle of inclination ($\theta2$) with respect to the axial direction than a second inclined part (82c) provided on the other radial side. By such a configuration, a clearance can be securely provided between adjacent first connecting parts (71), and a clearance can be securely provided between adjacent second connecting parts (82). By this, a first-connecting-part-side insulating layer (74) can be easily provided in a clearance between adjacent first connecting parts (71), and a second-connecting-part-side insulating layer (84) can be easily provided in a clearance between adjacent second connecting parts (82).

In addition, in the first embodiment, as described above, in one slot (12), a plurality of first leg parts (71) of the same phase are arranged radially and a plurality of second leg parts (81) of the same phase are arranged radially. By such a configuration, in the slot (12), an excessive increase in voltage difference between the first leg parts (71) can be prevented and an excessive increase in voltage difference between the second leg parts (81) can be prevented. As a result, even in a configuration in which the thickness (t1) of a first-leg-part-side insulating layer (73) is smaller than the thickness (t3+t4) of a first-connecting-part-side insulating layer (74) and the thickness (t2) of each second-leg-part-side insulating layer (83) is smaller than the thickness (t5+t6) of a second-connecting-part-side insulating layer (84), adjacent first leg parts (71) can be securely insulated from each other and adjacent second leg parts (81) can be securely insulated from each other.

In addition, in the first embodiment, as described above, the armature (100) includes sheet-type core leg part insulating members (20) provided separately from the first-leg-part-side insulating layers (73) and the second-leg-part-side insulating layers (83), and disposed between the slots (12) and the coil part (30). In addition, the armature (100) includes sheet-type joint part insulating members (21) each of which is provided separately from the core leg part insulating member (20) and insulates joint parts (90) radially adjacent to each other in one slot (12). In addition, each of the core leg part insulating members (20) and the joint part insulating members (21) is provided separately from the first-connecting-part-side insulating layers (74) and the second-connecting-part-side insulating layers (84). By such a configuration, even when a first-connecting-part-side insulating layer (74) and a second-connecting-part-side insulating layer (84) are damaged, insulation properties between a slot (12) and the coil part (30) can be secured by a core leg part insulating member (20). In addition, even when a first-connecting-part-side insulating layer (74) and a second-connecting-part-side insulating layer (84) are damaged, insulation properties between joint parts (90) can be secured by a joint part insulating member (21).

In addition, in the first embodiment, as described above, a first connecting part (72) has a first bent part (72a) that bends at the center of the first connecting part (72); and a pair of first diagonal parts (72b) that linearly extend toward pair of first leg parts (71) sides from the first bent part (72a). In addition, a second connecting part (82) has a second bent part (82a) that bends at the center of the second connecting part (82); and a pair of second diagonal parts (82b) that linearly extend toward pair of second leg parts (81) sides from the second bent part (82a). In addition, a first-connecting-part-side insulating layer (74) is provided on each of the first bent part (72a) and the pair of first diagonal parts (72b). In addition, a second-connecting-part-side insulating layer (84) is provided on each of the second bent part (82a) and the pair of second diagonal parts (82b). By such a configuration, compared to a case in which the first-connecting-part-side insulating layer (74) is provided only on either one of the first bent part (72a) and the pair of first diagonal parts (72b), adjacent first connecting parts (72) can be more securely insulated from each other. In addition, compared to a case in which the second-connecting-part-side insulating layer (84) is provided only on either one of the second bent part (82a) and the pair of second diagonal parts (82b), adjacent second connecting parts (82) can be more securely insulated from each other.

In addition, in the first embodiment, as described above, a first added insulating layer (74c) of a first-connecting-part-side insulating layer (74) provided on a first bent part (72a) and a first added insulating layer (74c) of a first-connecting-part-side insulating layer (74) provided on each of a pair of first diagonal parts (72b) are provided integrally. In addition, a second added insulating layer (84c) of a second-connecting-part-side insulating layer (84) provided on a second bent part (82a) and a second added insulating layer (84c) of a second-connecting-part-side insulating layer (84) provided on each of a pair of second diagonal parts (82b) are provided integrally. By such a configuration, compared to a case in which a first added insulating layer (74c) on a first bent part (72a) and a first added insulating layer (74c) on each of a pair of first diagonal parts (72b) are provided separately from each other, the number of parts can be reduced and the number of formation processes of the first added insulating layer (74c) can be reduced. In addition, compared to a case in which a second added insulating layer (84c) on a second bent part (82a) and a second added insulating layer (84c) on each of a pair of second diagonal parts (82b) are provided separately from each other, the number of parts can be reduced and the number of formation processes of the second added insulating layer (84c) can be reduced.

In addition, in the first embodiment, as described above, a first-connecting-part-side insulating layer (74) is provided so as to surround a first connecting part (72) in a circumferential manner at a cross-section orthogonal to a direction in which the first connecting part (72) extends. In addition, a second-connecting-part-side insulating layer (84) is provided so as to surround a second connecting part (82) in a circumferential manner at a cross-section orthogonal to a direction in which the second connecting part (82) extends. By such a configuration, compared to a case in which a part of a first connecting part (72) is covered with a first-connecting-part-side insulating layer (74) at a cross-section orthogonal to a direction in which the first connecting part (72) extends, adjacent first connecting parts (72) can be more securely insulated from each other. In addition, compared to a case in which a first-connecting-part-side insulating layer (74) is formed so as to cover a part of a first connecting part (72) at a cross-section orthogonal to a direction in which the first connecting part (72) extends, since there is no need to control (adjust) not to partially form a first-connecting-part-side insulating layer (74), formation of the first-connecting-part-side insulating layer (74) can be facilitated. In addition, compared to a case in which a part of a second connecting part (82) is covered with a second-connecting-part-side insulating layer (84) at a cross-section orthogonal to a direction in which the second connecting part (82) extends, adjacent second connecting parts (82) can be more securely insulated from each other. In addition, compared to a case in which a second-connecting-part-side insulating layer (84) is formed so as to cover a part of a second connecting part (82) at a cross-section orthogonal to a direction in which the second connecting part (82) extends, since there is no need to control (adjust) not to partially form a second-connecting-part-side insulating layer (84), formation of the second-connecting-part-side insulating layer (84) can be facilitated.

In addition, in the second embodiment, as described above, each of a pair of first leg parts (171) and a pair of second leg parts (181) is not provided with an insulating layer. In addition, at least a portion of a first connecting part (172) where first connecting parts (172) of different phases are disposed so as to be adjacent to each other and at least a portion of a second connecting part (182) where second connecting parts (182) of different phases are disposed so as to be adjacent to each other are provided with insulating layers (174, 184). By such a configuration, while insulation between the connecting parts (172, 182) is ensured, the space factor of the coil part (130) in the slots (12) can be increased as a result of not providing an insulating layer on the leg parts (171, 181).

In addition, in the first and second embodiments, as described above, a first connecting part (72, 172) has a first bent part (72a, 172a) that bends at the center of the first connecting part (72, 172); and a pair of first diagonal parts (72b, 172b) that extend toward pair of first leg parts (71, 171) sides from the first bent part (72a, 172a). A second connecting part (82, 182) has a second bent part (82a, 182a) that bends at the center of the second connecting part (82, 182); and a pair of second diagonal parts (82b, 182b) that extend toward pair of second leg parts (81, 181) sides from the second bent part (82a, 182a). The pair of first diagonal parts (72b and 172b) is disposed so as to extend to intersect with each other and so as to be shifted relative to each other in radial location. In addition, the pair of second diagonal parts (82b and 182b) is disposed so as to extend to intersect with each other and so as to be shifted relative to each other in radial location. In addition, at least one of the pair of first diagonal parts (72b, 172b) has a portion (72e) that is partially provided on a plane (72d) facing radially and that is adjacent to a first connecting part (72, 172) of a different phase. At least one of the pair of second diagonal parts (82b, 182b) has a portion (82e) that is partially provided on a plane (82d) facing radially and that is adjacent to a second connecting part (82, 182) of a different phase. By such a configuration, compared to a case in which the entire plane (72d) of a first diagonal part (72b, 172b) (the entire plane (82d) of a second diagonal part (82b, 182b)) is adjacent to a different phase, radially adjacent connecting parts (72, 82, 172, 182) can be more securely insulated from each other.

In addition, in the first and second embodiments, as described above, a pair of first leg parts (71, 171) is disposed so as to be shifted relative to each other in radial location by an amount corresponding to a radial width (W11) of the first leg part (71, 171). In addition, a pair of second leg parts (81, 181) is disposed so as to be shifted relative to each other in radial location by an amount corresponding to a radial width (W12) of the second leg part (81, 181). A pair of first diagonal parts (72b, 172b) is disposed so as to be shifted relative to each other in radial location by an amount corresponding to the radial width (W11) of the first leg part (71, 171). A pair of second diagonal parts (82b, 182b) is disposed so as to be shifted relative to each other in radial location by an amount corresponding to the radial width (W12) of the second leg part (81, 181). By such a configuration, a pair of first leg parts (71, 171) can be disposed in radially adjacent lanes (conductor disposition regions provided in ring shape), and a pair of first diagonal parts (72b, 172b) can be disposed in radially adjacent lanes. In addition, a pair of second leg parts (81, 181) can be disposed in radially adjacent lanes, and a pair of second diagonal parts (82b, 182b) can be disposed in radially adjacent lanes.

In addition, in the first and second embodiments, as described above, all of a plurality of first leg parts (71, 171) and a plurality of second leg parts (81, 181) that are disposed in each of the plurality of slots (12) are of the same phase. By such a configuration, in one slot (12), leg parts (71, 81, 171, 181) of different phases are not adjacent to each other, and thus, the insulation performance of the leg parts (71, 81, 171, 181) can be made relatively small. As a result, there is no need to perform an insulation process, e.g., provision of an insulating coating with a relatively large thickness, on the leg parts (71, 81, 171, 181), and thus, the space factor of the coil part (30, 130) in the slots (12) can be further improved.

[Variants]

Note that the presently disclosed embodiments are to be considered in all respects as illustrative and not restrictive. The scope of the present disclosure is indicated by the claims rather than the description of the above-described embodiments, and all changes (variants) which come within the meaning and range of equivalency of the claims are further embraced therein.

For example, although the above-described first embodiment shows an example in which a first connecting part 72 is provided with a first added insulating layer 74c and a second connecting part 82 is provided with a second added insulating layer 84c, the present disclosure is not limited thereto. For example, with the first added insulating layer 74c not provided, the thickness t3 of a first base insulating layer 74a may be made larger than the thickness t1 of an insulating layer 73 (first-leg-part-side insulating layer). In addition, with the second added insulating layer 84c not provided, the thickness t5 of a second base insulating layer 84a may be made larger than the thickness t2 of an insulating layer 83 (second-leg-part-side insulating layer).

In addition, although the above-described first embodiment shows an example in which a first bent part 72a is provided with a first added insulating layer 74c and a second bent part 82a is provided with a second added insulating layer 84c, the present disclosure is not limited thereto. For example, the first bent part 72a may not be provided with the first added insulating layer 74c, and the second bent part 82a may not be provided with the second added insulating layer 84c.

In addition, although the above-described first embodiment shows an example in which the entire first diagonal part 72b is provided with a first added insulating layer 74c and the entire second diagonal part 82b is provided with a second added insulating layer 84c, the present disclosure is not limited thereto. For example, if there is a portion of the first diagonal part 72b where a first diagonal part 72b of a different phase is not provided so as to be adjacent to the first diagonal part 72b, then the portion may not be provided with a first added insulating layer 74c. In addition, if there is a portion of the second diagonal part 82b where a second diagonal part 82b of a different phase is not provided so as to be adjacent to the second diagonal part 82b, then the portion may not be provided with a second added insulating layer 84c.

In addition, although the above-described first embodiment shows an example in which those of a plurality of first connecting parts 72 arranged radially in one slot 12 other than a first connecting part 72 provided on the radial innermost side are provided with first inclined parts 72c, the present disclosure is not limited thereto. For example, all of the plurality of first connecting parts 72 arranged radially may be provided with first inclined parts 72c. Likewise, all of a plurality of second connecting parts 82 arranged radially may be provided with second inclined parts 82c.

In addition, although the above-described first embodiment shows an example in which each of a first inclined part 72c and a second inclined part 82c is inclined toward the radial outer side, the present disclosure is not limited thereto. For example, each of the first inclined part 72c and the second inclined part 82c may be inclined toward the radial inner side. In addition, the first inclined part 72c and the second inclined part 82c may be radially inclined in opposite directions.

In addition, although the above-described first embodiment shows an example in which a first added insulating layer 74c of an insulating layer 74 (first-connecting-part-side insulating layer) provided on a first bent part 72a and a first added insulating layer 74c of an insulating layer 74 (first-connecting-part-side insulating layer) provided on each of a pair of first diagonal parts 72b are provided integrally, the present disclosure is not limited thereto. For example, the first added insulating layer 74c of the insulating layer 74 (first-connecting-part-side insulating layer) and the first added insulating layer 74c of the insulating layer 74 (first-connecting-part-side insulating layer) provided on each of the pair of first diagonal parts 72b may be provided separately from each other. Likewise, a second added insulating layer 84c of an insulating layer 84 (second-connecting-part-side insulating layer) and a second added insulating layer 84c of an insulating layer 84 (second-connecting-part-side insulating layer) provided on each of a pair of second diagonal parts 82b may be provided separately from each other.

In addition, although the above-described first embodiment shows an example in which a first added insulating layer 74c and a first base insulating layer 74a are made of the same material and a second added insulating layer 84c and a second base insulating layer 84a are made of the same material, the present disclosure is not limited thereto. For example, the first added insulating layer 74c and the first base insulating layer 74a may be made of different materials and the second added insulating layer 84c and the second base insulating layer 84a may be made of different materials.

In addition, although the above-described first embodiment shows an example in which after forming first added insulating layers 74c and second added insulating layers 84c, assemblies (30a, 30b) are formed, the present disclosure is not limited thereto. For example, after forming assemblies (30a, 30b), first added insulating layers 74c and second added insulating layers 84c may be formed. In addition, first added insulating layers 74c and second added insulating layers 84c may be formed, with assemblies (30a, 30b) partially formed (with only some segment conductors (40) combined together).

Figure 26:
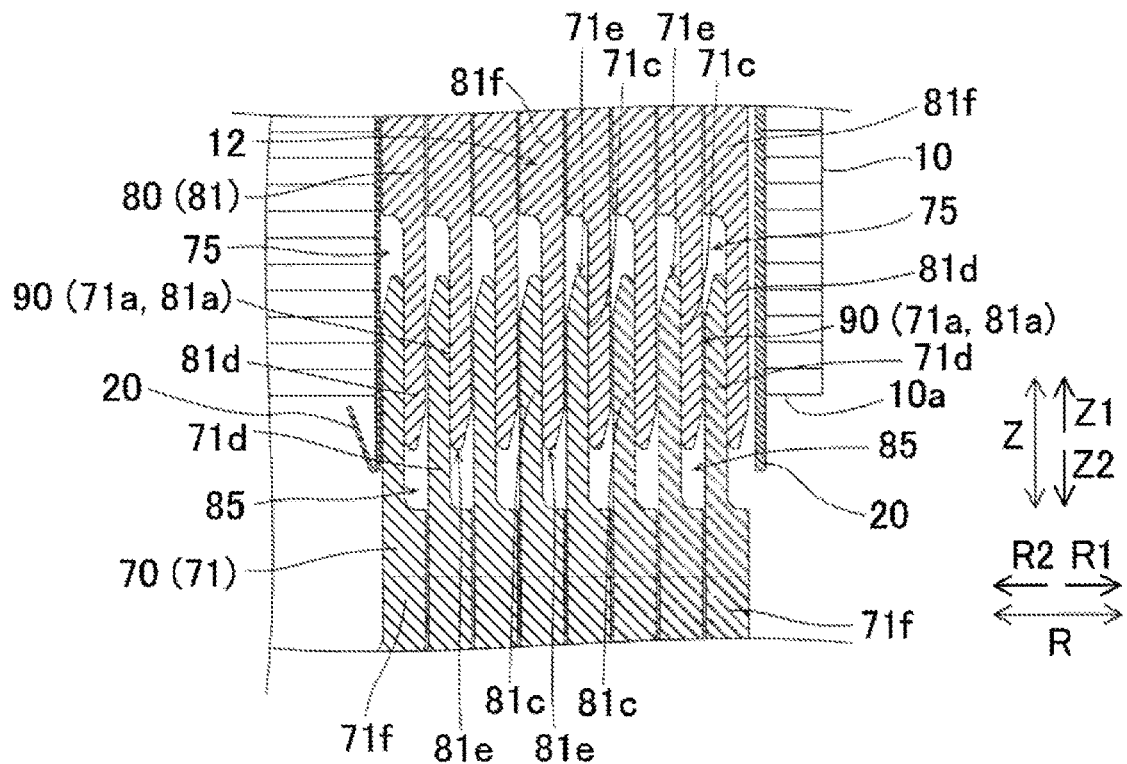
FIG. 26 is a partial enlarged view of a portion near joint parts of a stator according to a first variant of the first embodiment.
Figure 27:
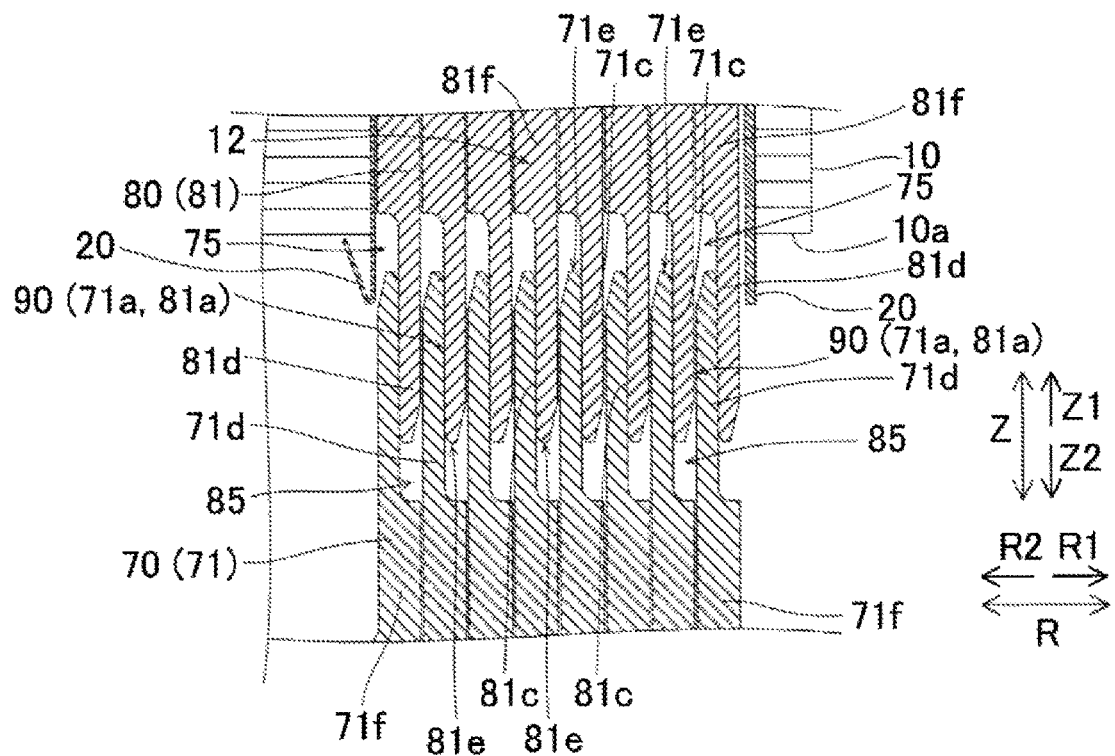
FIG. 27 is a partial enlarged view of a portion near joint parts of a stator according to a second variant of the first embodiment.

In addition, although the above-described first embodiment shows an example in which a joint part 90 is disposed in a slot 12, the present disclosure is not limited thereto. For example, a part of a joint part 90 may be disposed in a slot 12 (see FIG. 26). In addition, the entire joint part 90 may be disposed outside a slot 12 (see FIG. 27).

In addition, although the above-described first embodiment shows an example in which a joint part 90 is provided on the other axial side (Z2-direction side) in a slot 12 of the stator core 10 (armature core), the present disclosure is not limited thereto. For example, a joint part 90 may be provided at an axial center or on one axial side (Z1-direction side) of the stator core 10 (armature core).

In addition, although the above-described first and second embodiments show an example in which a plurality of sets of first leg parts 71 (171) and second leg parts 81 (181) are provided in a slot 12, the present disclosure is not limited thereto. The configuration may be such that only one set of a first leg part 71 (171) and a second leg part 81 (181) may be provided in a slot 12.

Figure 28A:
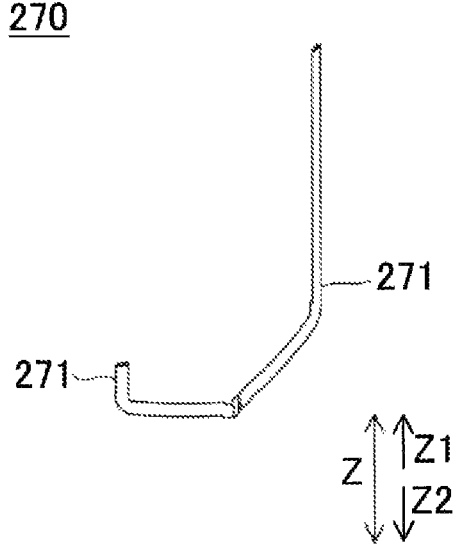
FIG. 28 is perspective views of a first conductor and a second conductor according to a third variant of the first embodiment (FIG. 28A is a perspective view of the first conductor as viewed from a radial outer side and FIG. 28B is a perspective view of the second conductor as viewed from the radial outer side).
Figure 28B:
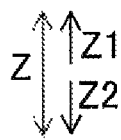

In addition, although the above-described first embodiment shows an example in which a pair of first leg parts 71 of a first conductor 70 has equal lengths (L1) and a pair of second leg parts 81 of a second conductor 80 has equal lengths (L2), the present disclosure is not limited thereto. For example, the configuration may be such that a pair of first leg parts 271 of a first conductor 270 has different lengths (see FIG. 28A) and a pair of second leg parts 281 of a second segment conductor 280 has different lengths (see FIG. 28B). Namely, in this case, each of the first segment conductor 270 and the second segment conductor 280 has a J-shape (substantially J-shape).

In addition, although the above-described first embodiment shows an example in which the length of a second leg part 81 is longer than the length of a first leg part 71, the present disclosure is not limited thereto. For example, the length of the second leg part 81 may be shorter than the length of the first leg part 71.

In addition, although the above-described first and second embodiments show an example in which the stator 100 (200) (armature) forms a part of the inner-rotor rotating electrical machine 102 (202), the present disclosure is not limited thereto. For example, the stator may form a part of an outer-rotor rotating electrical machine.

In addition, although the above-described first and second embodiments show an example in which a second conductor 80 (180) is a lead side conductor and a first conductor 70 (170) is a counter-lead side conductor, the present disclosure is not limited thereto. For example, the second conductor 80 (180) may be a counter-lead side conductor and the first conductor 70 (170) may be a lead side conductor.

In addition, although the above-described first embodiment shows an example in which the core leg part insulating members 20 and the joint part insulating members 21 are of sheet type, the present disclosure is not limited thereto. The present disclosure can also be applied to a stator including core leg part insulating members 20 and joint part insulating members 21 that are not of sheet type.

In addition, although the above-described second embodiment shows an example in which an insulating member 120 having a bellows shape is disposed in a slot 12, the present disclosure is not limited thereto. For example, an insulating member having a ladder shape may be disposed in a slot 12.

Figure 29:
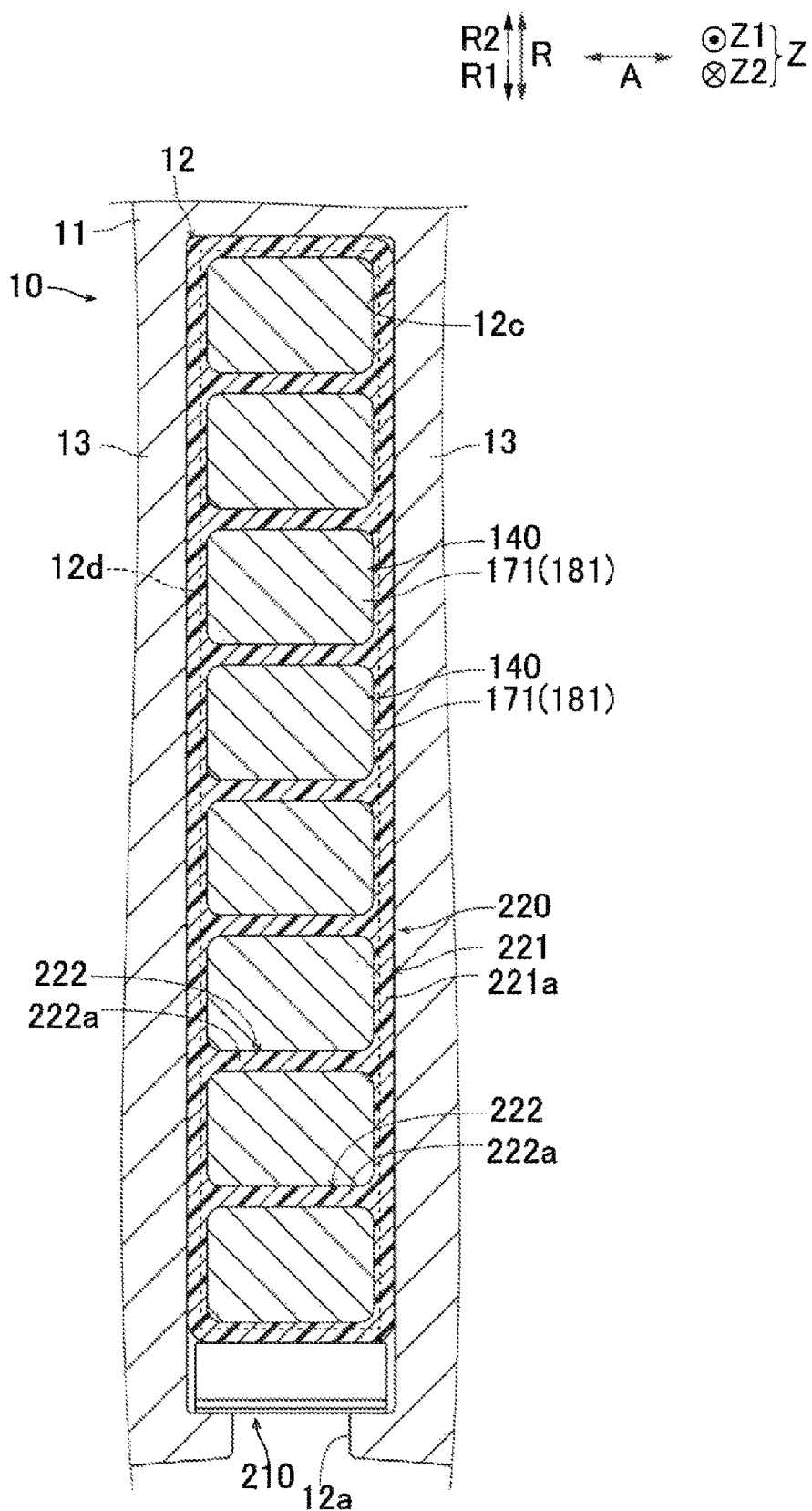
FIG. 29 is a cross-sectional view showing a configuration of an insulating member according to a fourth variant of the second embodiment.

Specifically, as shown in FIG. 29, an insulating member 220 includes a first insulating part 221 and a second insulating part 222. The first insulating part 221 includes a ring-shaped portion 221a provided in ring shape so as to surround a region 12d where all segment conductors 140 in a slot 12 are disposed. The second insulating part 222 includes inter-segment-conductor portions 222a each provided between segment conductors 140 in the same slot 12 so as to extend in the circumferential direction (A-direction) of the stator core 10. The inter-segment-conductor portions 222a are formed continuously with the ring-shaped portion 221a. Namely, the ring-shaped portion 221a included in the first insulating part 221 is integrally formed with the inter-segment-conductor portions 222a included in the second insulating part 222. Note that the insulating member 220 has a ladder shape as viewed in the Z-direction.

In addition, although the above-described second embodiment shows an example in which a connecting part (172, 182) is provided with an insulating layer (174, 184), the present disclosure is not limited thereto. If the connecting part (172, 182) has higher insulation performance (insulatable voltage value) than a leg part (171, 181), then the insulating layer (174, 184) may not be provided on the connecting part (172, 182).

REFERENCE SIGNS LIST

10: Stator core (armature core), 12: Slot, 20: Core leg part insulating member, 21: Joint part insulating member, 30, 130: Coil part, 70, 170, 270: First conductor, 71, 171, 271: First leg part, 71a: End part (end part on one axial side of the first leg part), 71b: End part (end part on the other axial side of the first leg part), 72, 172: First connecting part, 72a, 172a: First bent part, 72b, 172b: First diagonal part, 72c: First inclined part, 72d: Plane (plane of the first diagonal part), 72e: Portion (portion of the first diagonal part), 73: Insulating layer (first-leg-part-side insulating layer), 74: Insulating layer (first-connecting-part-side insulating layer), 74a: First base insulating layer, 74b: Surface (surface of a first base insulating layer), 74c: First added insulating layer, 80, 180, 280: Second conductor, 81, 181, 281: Second leg part, 81a: End part (end part on the other axial side of the second leg part), 81b: End part (end part on one axial side of the second leg part), 82, 182: Second connecting part, 82a, 182a: Second bent part, 82b, 182b: Second diagonal part, 82c: Second inclined part, 82d: Plane (plane of the second diagonal part), 82e: Portion (portion of the second diagonal part), 83: Insulating layer (second-leg-part-side insulating layer), 84: Insulating layer (second-connecting-part-side insulating layer), 84a: Second base insulating layer, 84b: Surface (surface of a second base insulating layer), 84c: Second added insulating layer, 90: Joint part, 100, 200: Stator (armature), 174, 184: Insulating layer, 190: Contact part (joint part), t1: Thickness (thickness of the first-leg-part-side insulating layer), t2: Thickness (thickness of the second-leg-part-side insulating layer), t3: Thickness (thickness of the first base insulating layer), t5: Thickness (thickness of the second base insulating layer), $\theta 1$: Angle of inclination (angle of inclination of the first inclined part), and $\theta 2$: Angle of inclination (angle of inclination of the second inclined part)

The invention claimed is:

1. An armature comprising:
an armature core provided with a plurality of slots extending in an axial direction; and
a coil part including: first segment conductors of a plurality of phases each including a pair of first leg parts extending toward one axial side in the axial direction, and a first connecting part that connects together end parts on an other axial side of the pair of first leg parts; second segment conductors of a plurality of phases each including a pair of second leg parts extending toward the other axial side in the axial direction, and a second connecting part that connects together end parts on the one axial side of the pair of second leg parts; and a joint part where an end part on the one axial side of one of the first leg parts and an end part on the other axial side of one of the second leg parts are joined together in one of the slots or axially outside one of the slots,
wherein
the first leg parts of each of the plurality of first segment conductors each are disposed so as to be adjacent to the first leg part of a same phase,
the second leg parts of each of the plurality of second segment conductors each are disposed so as to be adjacent to the second leg part of a same phase,
the first connecting part of each of the plurality of first segment conductors is disposed so as to be adjacent to the first connecting part of a different phase,
the second connecting part of each of the plurality of second segment conductors is disposed so as to be adjacent to the second connecting part of a different phase,
the first connecting part and the second connecting part have a higher insulatable voltage value than the first leg parts and the second leg parts,
each of the pair of first leg parts and the pair of second leg parts is not provided with an insulating layer, and
at least a portion of the first connecting part where the first connecting parts of different phases are disposed so as to be adjacent to each other and at least a portion of the second connecting part where the second connecting parts of different phases are disposed so as to be adjacent to each other are provided with an insulating layer.

2. The armature according to claim 1, wherein
in one of the slots, a plurality of the first leg parts are arranged radially and a plurality of the second leg parts are arranged radially,
a plurality of the first connecting parts are arranged radially on the other axial side of the slot,
a plurality of the second connecting parts are arranged radially on the one axial side of the slot,
at least one of the plurality of the first connecting parts arranged radially is provided with a first inclined part that is inclined toward one radial side, and
at least one of the plurality of the second connecting parts arranged radially is provided with a second inclined part that is inclined toward one radial side.

3. The armature according to claim 2, wherein
each of a plurality of the first inclined parts and a plurality of the second inclined parts is arranged radially,
one of the first inclined parts provided on one radial side has a greater angle of inclination with respect to the axial direction than one of the first inclined parts provided on an other radial side, and
one of the second inclined parts provided on one radial side has a greater angle of inclination with respect to the axial direction than one of the second inclined parts provided on an other radial side.

4. The armature according to claim 2, wherein in one of the slots, the plurality of first leg parts of a same phase are arranged radially and the plurality of second leg parts of a same phase are arranged radially.

5. The armature according to claim 1, wherein
the first connecting part has a first bent part that bends at a center of the first connecting part; and a pair of first diagonal parts that extend toward the pair of first leg parts sides from the first bent part,
the second connecting part has a second bent part that bends at a center of the second connecting part; and a pair of second diagonal parts that extend toward the pair of second leg parts sides from the second bent part,
a first-connecting-part-side insulating layer is provided on each of the first bent part and the pair of first diagonal parts, and
a second-connecting-part-side insulating layer is provided on each of the second bent part and the pair of second diagonal parts.

6. The armature according to claim 5, wherein
the first-connecting-part-side insulating layer includes: a first base insulating layer and a first added insulating layer provided on a surface of the first base insulating layer,
the second-connecting-part-side insulating layer includes: a second base insulating layer and a second added insulating layer provided on a surface of the second base insulating layer,
the first added insulating layer of the first-connecting-part-side insulating layer provided on the first bent part and the first added insulating layer of the first-connecting-part-side insulating layer provided on each of the pair of first diagonal parts are provided integrally, and
the second added insulating layer of the second-connecting-part-side insulating layer provided on the second bent part and the second added insulating layer of the second-connecting-part-side insulating layer provided on each of the pair of second diagonal parts are provided integrally.

7. The armature according to claim 1, wherein
a first-connecting-part-side insulating layer is provided so as to surround the first connecting part in a circumferential manner at a cross-section orthogonal to a direction in which the first connecting part extends, and
a second-connecting-part-side insulating layer is provided so as to surround the second connecting part in a circumferential manner at a cross-section orthogonal to a direction in which the second connecting part extends.

8. The armature according to claim 1, wherein
the first connecting part has a first bent part that bends at a center of the first connecting part; and a pair of first diagonal parts that extend toward the pair of first leg parts sides from the first bent part,
the second connecting part has a second bent part that bends at a center of the second connecting part; and a pair of second diagonal parts that extend toward the pair of second leg parts sides from the second bent part,
the pair of first diagonal parts is disposed so as to extend to intersect with each other and so as to be shifted relative to each other in radial location, the pair of second diagonal parts is disposed so as to extend to intersect with each other and so as to be shifted relative to each other in radial location, at least one of the pair of first diagonal parts has a portion that is partially provided on a plane facing radially and that is adjacent to the first connecting part of a different phase, and at least one of the pair of second diagonal parts has a portion that is partially provided on a plane facing radially and that is adjacent to the second connecting part of a different phase.

9. The armature according to claim 8, wherein the pair of first leg parts is disposed so as to be shifted relative to each other in radial location by an amount corresponding to a radial width of the first leg part, the pair of second leg parts is disposed so as to be shifted relative to each other in radial location by an amount corresponding to a radial width of the second leg part, the pair of first diagonal parts is disposed so as to be shifted relative to each other in radial location by an amount corresponding to the radial width of the first leg part, and the pair of second diagonal parts is disposed so as to be shifted relative to each other in radial location by an amount corresponding to the radial width of the second leg part.

10. The armature according to claim 1, wherein all of the plurality of first leg parts and the plurality of second leg parts disposed in each of the plurality of slots are of a same phase.

* * * * *